(12) United States Patent
Jeong et al.

(10) Patent No.: US 10,077,354 B2
(45) Date of Patent: Sep. 18, 2018

(54) EPOXY COMPOSITIONS

(71) Applicant: FRX POLYMERS, INC., Chelmsford, MA (US)

(72) Inventors: Youmi Jeong, Boxborough, MA (US); Lawino Kagumba, Cambridge, MA (US); Jan-Pleun Lens, Reading, MA (US)

(73) Assignee: FRX POLYMERS, INC., Chelmsford, MA (US)

( * ) Notice: Subject to any disclaimer, the term of this patent is extended or adjusted under 35 U.S.C. 154(b) by 0 days.

(21) Appl. No.: 14/688,467

(22) Filed: Apr. 16, 2015

(65) Prior Publication Data

US 2015/0252228 A1     Sep. 10, 2015

Related U.S. Application Data

(63) Continuation of application No. 14/638,262, filed on Mar. 4, 2015.

(60) Provisional application No. 61/947,900, filed on Mar. 4, 2014.

(51) Int. Cl.
| | |
|---|---|
| *C08K 5/52* | (2006.01) |
| *C08K 5/21* | (2006.01) |
| *C08K 5/00* | (2006.01) |
| *C08K 5/134* | (2006.01) |
| *C08K 5/29* | (2006.01) |
| *C08K 5/527* | (2006.01) |
| *C08K 5/5333* | (2006.01) |
| *C08K 5/53* | (2006.01) |
| *C08K 5/5317* | (2006.01) |
| *C08K 7/14* | (2006.01) |
| *C08G 59/00* | (2006.01) |
| *C08G 59/40* | (2006.01) |
| *C08G 59/50* | (2006.01) |
| *C08G 79/02* | (2016.01) |
| *C08G 79/04* | (2006.01) |
| *C08L 63/00* | (2006.01) |
| *C08L 85/02* | (2006.01) |
| *B32B 27/38* | (2006.01) |
| *C08J 3/20* | (2006.01) |
| *C08J 5/24* | (2006.01) |
| *C09D 163/00* | (2006.01) |
| *C09D 163/04* | (2006.01) |
| *C09D 185/02* | (2006.01) |
| *C09J 163/00* | (2006.01) |
| *C09J 163/04* | (2006.01) |
| *C09J 185/02* | (2006.01) |
| *C09K 21/12* | (2006.01) |
| *C09K 21/14* | (2006.01) |

(52) U.S. Cl.
CPC ............ *C08K 5/52* (2013.01); *C08G 59/4042* (2013.01); *C08G 79/02* (2013.01); *C08G 79/04* (2013.01); *C08K 5/134* (2013.01); *C08K 5/21* (2013.01); *C08K 5/29* (2013.01); *C08K 5/527* (2013.01); *C08K 5/53* (2013.01); *C08K 5/5317* (2013.01); *C08L 63/00* (2013.01); *C08L 85/02* (2013.01); *C09D 163/04* (2013.01); *C09J 163/04* (2013.01)

(58) Field of Classification Search
CPC .... C08G 79/02; C08G 79/04; C08G 59/4042; C08L 63/00–63/10; C08L 69/00; C08L 85/02; C09D 163/00–163/10; C09D 169/00; C09D 185/02; C09J 163/00–163/10; C09J 169/00; C09J 185/02; C08K 5/29; C08K 5/52; C08K 5/524; C08K 5/527; C08K 5/53; C08K 5/5317

See application file for complete search history.

(56) References Cited

U.S. PATENT DOCUMENTS

| | | | | |
|---|---|---|---|---|
| 4,876,033 | A * | 10/1989 | Dziurla | ............... C08K 3/04 252/511 |
| 5,393,839 | A * | 2/1995 | Iwamoto | ............ C08G 18/003 525/111 |
| 6,861,499 | B2 | 3/2005 | Vinciguerra et al. | |
| 7,645,850 | B2 | 1/2010 | Freitag | |
| 7,816,486 | B2 | 10/2010 | Freitag et al. | |
| 7,838,604 | B2 | 11/2010 | Freitag | |
| 9,534,109 | B2 | 1/2017 | Hoerold et al. | |
| 2005/0020800 | A1 | 1/2005 | Levchik et al. | |
| 2005/0101708 | A1 | 5/2005 | Knop et al. | |
| 2008/0200589 | A1* | 8/2008 | Hubschmid | ............ C08L 53/00 523/436 |
| 2009/0032770 | A1 | 2/2009 | Freitag et al. | |

(Continued)

FOREIGN PATENT DOCUMENTS

| | | |
|---|---|---|
| CN | 1639174 | 7/2005 |
| CN | 103140547 | 6/2013 |

(Continued)

OTHER PUBLICATIONS

Abstract of JP 04008542 A.*

(Continued)

*Primary Examiner* — Kregg T Brooks
(74) *Attorney, Agent, or Firm* — Pepper Hamilton LLP

(57) ABSTRACT

Epoxy resin compositions that include oligomeric phosphonates, carbodiimides, carbodiimides and phenolic antioxidants or phosphite antioxidants, oligomeric phosphonates and carbodiimides, or oligomeric phosphonates, carbodiimides, and phenolic antioxidants or phosphite antioxidants and exhibit improved glass transition temperature, improved heat resistance, and improved flame retardancy are described herein.

27 Claims, No Drawings

(56) References Cited

U.S. PATENT DOCUMENTS

| | | | |
|---|---|---|---|
| 2009/0192257 A1* | 7/2009 | Hayata | C08K 7/24 |
| | | | 524/508 |
| 2011/0275743 A1 | 11/2011 | Ishii et al. | |
| 2012/0172500 A1* | 7/2012 | Freitag | C07F 9/4006 |
| | | | 524/101 |
| 2012/0238676 A1 | 9/2012 | Smit et al. | |
| 2013/0109792 A1 | 5/2013 | Hoerold et al. | |
| 2015/0183992 A1* | 7/2015 | Zeng | C08L 63/00 |
| | | | 428/416 |
| 2015/0240080 A1* | 8/2015 | Zhou | C09K 21/12 |
| | | | 523/435 |

FOREIGN PATENT DOCUMENTS

| | | | |
|---|---|---|---|
| EP | 0989788 A2 | | 3/2000 |
| JP | 04008542 A | * | 1/1992 |
| WO | 03/029258 A1 | | 4/2003 |
| WO | 2009145224 A1 | | 12/2009 |

OTHER PUBLICATIONS

International Search Report and Written Opinion for PCT/US2015/018721 dated May 19, 2015.
Database WPI, Week 200982, Thomas Scientific, London, GB; AN 2009-R89803 XP00277399.
Extended European Search Report for EP 15757713 dated Sep. 21, 2017.

* cited by examiner

EPOXY COMPOSITIONS

CROSS-REFERENCE TO RELATED APPLICATIONS

This application is a continuation of U.S. application Ser. No. 14/638,262 entitled "Epoxy Compositions" filed Mar. 4, 2015 and claims priority to U.S. Provisional No. 61/947,900 entitled "Epoxy Compositions" filed Mar. 4, 2014, the entire contents of which are hereby incorporated by reference in their entireties.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Epoxy resins are among the most important industrial polymers in the world and are used in large quantities in the production of adhesives, paints and coatings, and matrix resins. The core substrate in the production of epoxy resins is typically 2,2-bis(4-hydroxyphenyl)isopropylidiene (bisphenol A). The main monomer used in the epoxy resin industry is the diglycidyl ether of bisphenol A, (2,2-Bis(4-glycidyloxyphenyl)propane), which represents more than 75% of the resin used in industrial applications. This monomer is usually prepared from 2,2-Bis(4-hydroxyphenyl) isopropylidiene (bisphenol A) and epichlorohydrin using a strong base such as sodium hydroxide. Alternative synthetic methods have been developed such as allylating bisphenol A followed by epoxidization.

One significant application for epoxy resins derived from the diglycidyl ether of bisphenol A is in glass fiber reinforced laminates as rigid or flexible circuit board substrates used in a variety of industrial and consumer electronic products and electronic components. These materials must be fire resistant to meet safety requirements. The approach to render these materials fire resistant has been to use a variety of additives such as brominated compounds, phosphorous containing compounds, aluminum derivatives, melamine cyanurate, metal phosphinates and combinations thereof. Due to environmental considerations, some of the more commonly used halogenated flame retardants are being banned from use because they can leach out into the environment and are toxic. As is the case with most additives for polymers, the other flame retardants suffer from the same problem, it is just that they have not received the attention that the halogenated systems have, but many of them are toxic and they all are subject to leach out of the host resin. Thus there is a need to render epoxy derived resins fire resistant in a way that is practical, cost effective and environmentally friendly.

Processes for preparing flame retardant epoxy resins disclosed thus far are focused on the reaction of an epoxy resin with a flame-retardant additive or a curing agent or chain extender. An approach that produces an inherently flame retardant epoxy based monomer, oligomer, polymer, or co-polymer would be ideal. Phosphonate polymers, copolymers, oligomers and co-oligomers having a wide variety of chemical structures which may contain reactive end groups such as hydroxyl groups are known. However, prior art, which has disclosed the reaction of bisphenol A and epichlorohydrin with sodium hydroxide base is not applicable to phosphonate monomers or polymers, copolymers, oligomers or co-oligomers because the use of a strong base to conduct the synthesis causes hydrolysis of the phosphonate groups leading to chain cleavage (and thus reduction of molecular weight) and phosphonic acid groups as well as other unwanted reactions leading to a complex mixture of by-products.

SUMMARY OF THE INVENTION

Various embodiments of the invention are directed to compositions including an epoxy resin, one or more oligomeric phosphonates, and one or more carbodiimides. In some embodiments, the epoxy resin may be selected from the group consisting of novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylol-propane type epoxy resin, terpene-modified epoxy resin, linear aliphatic epoxy resin obtained by oxidizing olefin bonds with peracetic acid or a similar peracid, alicyclic epoxy resin, sulfur-containing epoxy resin, phenolic novolac type epoxy containing benzoxazines such as bisphenol-A based benzoxazines, bisphenol-F based benzoxazines, dicyclopentadiene based benzoxazines, phenolpthalein based benzoxazines, polyphenol-A type benzoxazines and combinations thereof.

In some embodiments, the one or more oligomeric phosphonates may be selected from the group consisting of linear oligomeric phosphonates, branched oligomeric phosphonates, and hyperbranched oligomeric phosphonates. In particular embodiments, the one or more oligomeric phosphonates may have about 60% to about 100% reactive end groups based on a total number of termini, and in some embodiments, the reactive end groups may be selected from the group consisting of hydroxyl, carboxylic acid, epoxy, glycidyl ether, vinyl, vinyl ester, isopropenyl, isocyanate, and combinations thereof. In certain embodiments, the reactive end groups may be hydroxyl.

In various embodiments, the one or more oligomeric phosphonates may be a random or block co-oligo(phosphonate ester) or a random or block co-oligo(phosphonate carbonate). In particular embodiments, the one or more oligomeric phosphonates comprise a compound of formula (I):

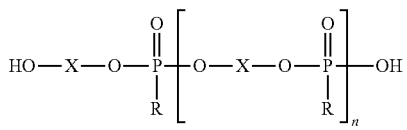

wherein R is a $C_1$ to $C_{20}$ alkyl or, optionally substituted, aryl group, X is an aromatic, cycloalkyl, or aliphatic group, and n is an integer of from 1 to about 10. In some embodiments, the one or more oligomeric phosphonates may have a weight average molecular weight as determined by gel permeation chromatography based on polystyrene standards of about 500 g/mole to about 18,000 g/mole. In certain embodiments, the one or more oligomeric phosphonates have a phosphorous content of about 2% to about 12% by weight. In particular embodiments, the compositions may include about 5 wt. % to about 60 wt. % of the one or more oligomeric phosphonates.

In certain embodiments, the one or more carbodiimides may be selected from the group consisting N,N'-dicyclohexylcarbodiimide, N-cyclohexyl-N'-(2-morpholinoethyl)carbodiimide metho-p-toluenesulfonate, bis(trimethylsilyl)carbodiimide, N-(3-dimethylaminopropyl)-N'-ethylcarbodiimide, N-(3-dimethylaminopropyl)-N'-ethylcarbodiimide hydrochloride, 1,3-di-p-tolylcarbodiimide, N,N'-bis(2-methylphenyl)carbodiimide, N-(tert-butyl)-N'-[1-(2-chlorophenyl)-1-methylethyl]carbodiimide, N-(tert-butyl)-N'-(2,6-dichlorophenyl)carbodiimide, N-butyl-N'-[1-(2-chlorophenyl)-1-methyl ethyl]carbodiimide, N,N'-diisopropylcarbodiimide, dicyclohexylcarbodiimide, N-benzyl-N'-cyclohexylcarbodiimide, and combinations thereof. In certain embodiments, the compositions may include about 0.01 wt. % to about 4.0 wt. % of the one or more carbodiimides.

In particular embodiments, the compositions may further include one or more antioxidants, and in some embodiments, the antioxidants may be selected from hindered phenolic antioxidants or a phosphite antioxidants, and combinations thereof.

In some embodiments, the compositions may further include one or more additional components selected from the group consisting of chopped or continuous glass fiber, metal fibers, aramid fibers, carbon fibers, or ceramic fibers, surfactants, organic binders, polymeric binders, crosslinking agents, diluents, coupling agents, flame retardant agents, anti-dripping agents, fluorinated polyolefins, silicones, lubricants, mould release agents, pentaerythritol tetrastearate, nucleating agents, anti-static agents, conductive blacks, carbon nanotubes, graphite, graphene, oxidized graphene, organic antistatics, polyalkylene ethers, alkylsulfonates, perfluor sulfonic acid, perfluorbutane, sulfonic acid potassium salt, polyamide-containing polymers, catalysts, colorants, inks, dyes, antioxidants, stabilizers, and combinations thereof. In such embodiments, the compositions may include about 0.001 wt. % to about 1 wt. % of each individual additional component.

Some embodiments are directed to methods for making an epoxy formulation including combining an epoxy resin, reactive phosphonate oligomer, carbodiimide, and a catalyst in a solvent to form a mixture; and heating the mixture. In certain embodiments, heating may be carried out to a temperature of about 20° C. to about 250° C., and in particular embodiments, heating may be carried out for 60 minutes to 300 minutes. In some embodiments, heating may be carried out at a pressure of about 3×103 Pa to about 1×10-1 Pa. In various embodiments, the catalyst may be selected from the group consisting of transition metal catalysts, tertiary amines, imidazole containing compounds, and combinations thereof. In some embodiments, the solvent may be selected from the group consisting of perfluorohexane, a,a,a-trifluorotoluene, pentane, hexane, cyclohexane, methylcyclohexane, decalin [c+t], dioxane, carbon tetrachloride, freon-11, benzene, toluene, triethyl amine, carbon disulfide, diisopropyl ether, diethyl ether (ether), t-butyl methyl ether (MTBE), chloroform, ethyl acetate, 1,2-dimethoxyethane (glyme), 2-methoxyethyl ether (diglyme), tetrahydrofuran (THF), methylene chloride, pyridine (Py), methyl ethyl ketone (MEK), acetone, hexamethylphosphoramide, N-methylpyrrolidinone, nitromethane, dimethylformamide, acetonitrile, sulfolane, dimethyl sulfoxide, and propylene carbonate.

Further embodiments are directed to articles of manufacture including an epoxy resin, one or more reactive oligomeric phosphonates, and one or more carbodiimides. In various embodiments, the article may be a prepreg or laminate, and in other embodiments, the article may be selected from the group consisting of televisions, computers, laptop computers, tablet computers, printers, cell phones, video games, DVD players, stereos, big data servers, and consumer electronics.

Other embodiments are directed to compositions containing an epoxy resin, one or more oligomeric phosphonates, and one or more hindered phenolic antioxidant, a phosphite antioxidant, or combinations thereof. In some embodiments, the one or more oligomeric phosphonates have a relative viscosity ($\eta$rel) as determined by dissolving the sample in dichloromethane at 25° C. at a concentration of 0.5 g polymer/liter and measuring the solution with a viscometer of about 1.01 to about 1.10. In various embodiments, the one or more oligomeric phosphonates may have reactive end groups selected from the group consisting of hydroxyl, carboxylic acid, epoxy, glycidyl ether, vinyl, vinyl ester, isopropenyl, isocyanate, and combinations thereof. In particular embodiments, the one or more oligomeric phosphonates comprise a compound of formula (I):

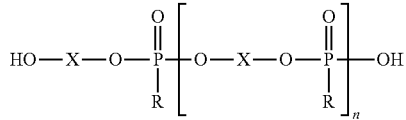

wherein R is a $C_1$ to $C_{20}$ alkyl or, optionally substituted, aryl group, X is an aromatic, cycloalkyl, or aliphatic group, and n is an integer of from 1 to about 10. In certain embodiments, the one or more oligomeric phosphonates have a phosphorous content of about 2% to about 12% by weight. In particular embodiments, the compositions may include about 5 wt. % to about 60 wt. % of the one or more oligomeric phosphonates.

In particular embodiments, the one or more hindered phenolic antioxidant, a phosphite antioxidant, or combinations thereof may be selected from the group consisting of sterically hindered phenolic antioxidants, hydrolytically stable organophosphites, organophosphite antioxidants, sterically hindered lactone antioxidants, octadecyl-3-(3,5-di-tert-butyl-4-hydroxyphenyl)propionate, N,N'-hexane-1,6-diylbis(3-(3,5-di-tert-butyl-4-hydroxyphenylpropionamide)), 3,3',3',5,5',5'-hexa-tert-butyl-a,a',a'-(mesitylene-2,4,6-triyl)tri-p-cresol, 4,6-bis(octylthiomethyl)-o-cresol, bis(2,4-ditert-butylphenyl) pentaerythritol diphosphite, tris(2,4-ditert-butylphenyl) phosphite, and combinations thereof. In some embodiments, the one or more hindered phenolic antioxidant, a phosphite antioxidant, or combinations thereof may be about 0.01 wt. % to about 1.0 wt. % of the composition.

DESCRIPTION OF DRAWINGS

Not applicable

DETAILED DESCRIPTION

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

"Optional" or "optionally" means that the subsequently described event or circumstance may or may not occur, and that the description includes instances where the event occurs and instances where it does not.

"Substantially no" means that the subsequently described event may occur at most about less than 10% of the time or the subsequently described component may be at most about less than 10% of the total composition, in some embodiments, and in others, at most about less than 5%, and in still others at most about less than 1%.

The term "carbonate" as used herein is given its customary meaning, e.g., a salt of carbonic acid containing the divalent, negative radical CO or an uncharged ester of this acid. A "diaryl carbonate" is a carbonate with at least two aryl groups associated with the CO radical, the most predominant example of a diaryl carbonate is diphenyl carbonate; however, the definition of diaryl carbonate is not limited to this specific example.

The term "aromatic dihydroxide" is meant to encompass any aromatic compound with at least two associated hydroxyl substitutions. Examples of "aromatic hydroxides" include but are not limited to benzene diols such as hydroquinone and any bisphenol or bisphenol containing compounds.

The term "alkyl" or "alkyl group" refers to a branched or unbranched hydrocarbon or group of 1 to 20 carbon atoms, such as but not limited to methyl, ethyl, n-propyl, isopropyl, n-butyl, isobutyl, t-butyl, octyl, decyl, tetradecyl, hexadecyl, eicosyl, tetracosyl and the like. "Cycloalkyl" or "cycloalkyl groups" are branched or unbranched hydrocarbons in which all or some of the carbons are arranged in a ring such as but not limited to cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic in nature. Aryls may include but are not limited to phenyl, napthyl, biphenyl ring systems and the like. The aryl group may be unsubstituted or substituted with a variety of substituents including but not limited to alkyl, alkenyl, halide, benzylic, alkyl or aromatic ether, nitro, cyano and the like and combinations thereof.

"Substituent" refers to a molecular group that replaces a hydrogen in a compound and may include but are not limited to trifluoromethyl, nitro, cyano, $C_1$-$C_{20}$ alkyl, aromatic or aryl, halide (F, Cl, Br, I), $C_1$-$C_{20}$ alkyl ether, $C_1$-$C_{20}$ alkyl ester, benzyl halide, benzyl ether, aromatic or aryl ether, hydroxy, alkoxy, amino, alkylamino (—NHR'), dialkylamino (—NR'R") or other groups which do not interfere with the formation of the diaryl alkylphosphonate.

As defined herein, an "arylol" or an "arylol group" is an aryl group with a hydroxyl, OH, group substituent on the aryl ring. Non-limiting examples of an arylol are phenol, naphthol, and the like. A wide variety of arlyols may be used in the embodiments of the invention and are commercially available.

The term "alkanol" or "alkanol group" refers to a compound including an alkyl of 1 to 20 carbon atoms or more having at least one hydroxyl group substituent. Examples of alkanols include but are not limited to methanol, ethanol, 1- and 2-propanol, 1,1-dimethylethanol, hexanol, octanol and the like. Alkanol groups may be optionally substituted with substituents as described above.

The term "alkenol" or "alkenol group" refers to a compound including an alkene 2 to 20 carbon atoms or more having at least one hydroxyl group substituent. The hydroxyl may be arranged in either isomeric configuration (cis or trans). Alkenols may be further substituted with one or more substituents as described above and may be used in place of alkanols in some embodiments of the invention. Alkenols are known to those skilled in the art and many are readily available commercially.

The terms "flame retardant," "flame resistant," "fire resistant," or "fire resistance," as used herein, means that the composition exhibits a limiting oxygen index (LOI) of at least 27. "Flame retardant," "flame resistant," "fire resistant," or "fire resistance," may also be tested by measuring the after-burning time in accordance with the UL test (Subject 94). In this test, the tested materials are given classifications of UL-94 V-0, UL-94 V-1 and UL-94 V-2 on the basis of the results obtained with the ten test specimens. Briefly, the criteria for each of these UL-94-V-classifications are as follows:

UL-94 V-0: the total flaming combustion for each specimen after removal of the ignition flame should not exceed 10 seconds and the total flaming combustion for 5 specimens should not exceed 50 seconds. None of the test specimens should release and drips which ignite absorbent cotton wool.

UL-94 V-1: the total flaming combustion for each specimen after removal of the ignition flame should not exceed 30 seconds and the total flaming combustion for 5 specimens should not exceed 250 seconds. None of the test specimens should release any drips which ignite absorbent cotton wool.

UL-94 V-2: the total flaming combustion for each specimen after removal of the ignition flame should not exceed 30 seconds and the total flaming combustion for 5 specimens should not exceed 250 seconds. Test specimens may release flaming particles, which ignite absorbent cotton wool.

Fire resistance may also be tested by measuring after-burning time. These test methods provide a laboratory test procedure for measuring and comparing the surface flammability of materials when exposed to a prescribed level of radiant heat energy to measure the surface flammability of materials when exposed to fire. The test is conducted using small specimens that are representative, to the extent possible, of the material or assembly being evaluated. The rate at which flames travel along surfaces depends upon the physical and thermal properties of the material, product or assembly under test, the specimen mounting method and orientation, the type and level of fire or heat exposure, the availability of air, and properties of the surrounding enclosure. If different test conditions are substituted or the end-use conditions are changed, it may not always be possible by or from this test to predict changes in the fire-test-response characteristics measured. Therefore, the results are valid only for the fire test exposure conditions described in this procedure.

The state-of-the-art approach to rendering polymers flame retardant is to use additives such as brominated compounds or compounds containing aluminum and/or phosphorus. Use of the additives with polymer can have a deleterious effect on the processing characteristics and/or the mechanical performance of articles produced from them. In addition, some of these compounds are toxic, and can leach into the environment over time making their use less desirable. In some countries, certain brominated additives are being phased-out of use because of environmental concerns.

"Molecular weight," as used herein, can be determined by relative viscosity ($\eta_{rel}$) and/or gel permeation chromatography (GPC). "Relative viscosity" of a polymer is measured by dissolving a known quantity of polymer in a solvent and comparing the time it takes for this solution and the neat solvent to travel through a specially designed capillary (viscometer) at a constant temperature. Relative viscosity is a measurement that is indicative of the molecular weight of a polymer. It is also well known that a reduction in relative viscosity is indicative of a reduction in molecular weight, and reduction in molecular weight causes loss of mechanical properties such as strength and toughness. GPC provides information about the molecular weight and molecular weight distribution of a polymer. It is known that the molecular weight distribution of a polymer is important to properties such as thermo-oxidative stability (due to different amount of end groups), toughness, melt flow, and fire resistance, for example, low molecular weight polymers drip more when burned.

The term "toughness," as used herein, is meant to imply that the material is resistant to breaking or fracturing when stressed or impacted. There are a variety of standardized tests available to determine the toughness of a material. Generally, toughness is determined qualitatively using a film or a molded specimen.

The phrase "low viscosity when sheared," "shear thinning," or similar phrases, as used herein, is meant to imply that when the material is melted and subjected to a shearing force, such as that encountered with certain types of mixers or when the melt is forced with pressure through a die or body having similar orifice, the viscosity is reduced. Shear thinning behavior may be transferred to blends of materials. Thus, the blend of, for example, the hyperbranched oligophosphonates or co-oligo(phosphonate carbonate)s and a thermoplastic, may exhibit shear thinning, while the thermoplastic alone or a blend of a thermoplastic and a linear or lightly branched oligophosphonate or co-oligo(phosphonate carbonate) do not. Shear thinning can be measured using standardized methods such as the Shear Thinning Index (STI). STI represents the ratio of the viscosity at a low rpm shear to the viscosity at a high rpm, generally, about ten times the low rotational speed. For example, low shear may be 1 rpm and high shear can be 10 rpm. The higher the STI value, the more shear thinning the material exhibits.

Some embodiments of the invention are directed to compositions including an epoxy resin; oligomeric phosphonates such as reactive oligophosphonates, random or block co-oligo(phosphonate ester)s, and random or block co-oligo (phosphonate carbonate)s; and one or more carbodiimides. In some embodiments, such compositions may further include additional stabilizers such as one or more phenolic antioxidants, one or more phosphite antioxidants, or a combination of phenolic antioxidants, and one or more phosphite antioxidants. The compositions of such embodiments may further include, for example, catalysts and solvents or other components known in the art. The compositions of such embodiments exhibit improved glass transition temperature, improved heat resistance, and improved flame retardancy over similar compositions lacking oligomeric phosphonates, carbodiimides, carbodiimides and phenolic antioxidants or phosphite antioxidants, oligomeric phosphonates and carbodiimides, or oligomeric phosphonates, carbodiimides, and phenolic antioxidants or phosphite antioxidants. Other embodiments are directed to methods for making such compositions and articles of manufacture composed of or incorporating such compositions.

Other embodiments of the invention are directed to compositions including an epoxy resin; oligomeric phosphonates such as reactive oligophosphonates, random or block co-oligo(phosphonate ester)s, and random or block co-oligo (phosphonate carbonate)s; and one or more phenolic antioxidants, one or more phosphite antioxidants, or a combination of phenolic antioxidants, and one or more phosphite antioxidants. In some embodiments, such compositions may further include one or more carbodiimides. The compositions of such embodiments may further include, for example, catalysts and solvents or other components known in the art. The compositions of such embodiments exhibit improved glass transition temperature, improved heat resistance, and improved flame retardancy over similar compositions lacking oligomeric phosphonates, carbodiimides, carbodiimides and phenolic antioxidants or phosphite antioxidants, oligomeric phosphonates and carbodiimides, or oligomeric phosphonates, carbodiimides, and phenolic antioxidants or phosphite antioxidants. Other embodiments are directed to methods for making such compositions and articles of manufacture composed of or incorporating such compositions.

Antioxidants such as the antioxidants described above are typically incorporated into polymer systems to improve heat stability and/or hydrolytic stability of the final compound without changing, for example, the mechanical properties or glass transition temperature of the base polymer. Surprisingly, the addition of antioxidants in the presence of reactive phosphonate oligomers in thermoset systems like epoxies was found to significantly enhance the glass transition temperature of the resulting cured formulation. Thus, compositions including epoxy resin, oligomeric phosphonates, and one or more phenolic antioxidants, one or more phosphite antioxidants, or a combination thereof may exhibit improved glass transition temperature, i.e., higher Tg, than epoxy resin compositions containing oligomeric phosphonates alone. For example, in some embodiments, epoxy compositions containing oligomeric phosphonates and one or more antioxidant may exhibit a Tg as determined by DSC of greater than 130° C., 135° C., or 140° C., or from about 130° C. to about 180° C., about 135° C. to about 170° C., or any range or individual value encompassed by these example ranges.

The oligomeric phosphonates of such embodiments may be linear, branched, or hyperbranched. In general, the concentration of reactive end groups based on the total number of termini for the oligomeric phosphonates may be high. For example, oligomeric phosphonates may have a percentage of the total number of termini having reactive end groups of from about 80% to 100%, about 85% to about 99%, or about 90% to about 98%. In other embodiments, greater than 90% of the total termini of the oligomeric phosphonate may have a reactive end group. For branched or hyperbranched oligomeric phosphonates of other embodiments, the percentage of the total number of termini having reactive end groups may be from about 50% to 100%, about 75% to about 95%, or about 80% to about 90%, and in certain embodiments, greater than 80% of the total termini for a branched or hyperbranched oligomeric phosphonate may have a reactive end group. The term "reactive end groups" is used to describe any chemical moiety at a branch termination that is capable of reacting with another chemical moiety. A large number of reactive functional groups are known in the art and encompassed by the invention. In particular embodiments, the reactive end groups may be hydroxyl, epoxy, vinyl, or isocyanate groups.

For simplicity, throughout this disclosure, the terms, "oligomeric phosphonates," "phosphonate oligomers," "oligophosphonates," and the like are to be construed as referring to any type of oligomer having phosphonate containing repeating units including oligophosphonates, random or block co-oligo(phosphonate ester)s, and random or block co-oligo(phosphonate carbonate)s. Such oligomers encompassed by these terms can be linear, lightly branched, indicating a relatively small number of branches, for example, 1 to about 5 branches per oligomer, or hyperbranched, indicating a relatively high number of branches, for example, greater than 5. While individual types of oligomers may be called out in specific exemplary embodiments, any oligomeric phosphonate described herein can be used in such exemplary embodiments. For example, an exemplary stating that an oligomeric phosphonate is used can be carried out with a linear, lightly branched, or hyperbranched oligomeric phosphonate that can be an oligophosphonate, random or block co-oligo(phosphonate ester), and random or block co-oligo(phosphonate carbonate) type oligomeric phosphonate.

The oligomeric phosphonates of various embodiments may be of low molecular weight. For example, in some embodiments, the molecular weight (weight average molecular weight as determined by gel permeation chromatography based on polystyrene calibration) range of the oligophosphonates may be from about 500 g/mole to about 18,000 g/mole or any value within this range. In other embodiments, the molecular weight range may be from about 1500 g/mole to about 15,000 g/mole, about 3000 g/mole to about 10,000 g/mole, or any value within these ranges. In still other embodiments, the molecular weight range may be from about 700 g/mole to about 9000 g/mole, about 1000 g/mole to about 8000 g/mole, about 3000 g/mole to about 4000 g/mole, or any value within these ranges. Low molecular weight may also be established based on the relative viscosity ($\eta$rel) as be determined by dissolving the sample in dichloromethane at 25° C. at a concentration of 0.5 g polymer/liter and measuring the solution with an Ubbelohde viscometer of from about 1.01 to about 1.20, or in some embodiments, the $\eta$rel can be from about 1.01 to about 1.14, about 1.01 to about 1.10, about 1.02 to about 1.08, or any individual value or range encompassed by these example ranges. In certain embodiments, the oligomeric phosphonates included in the compositions of the invention may exhibit an $\eta$rel of about 1.03 to about 1.05 or about 1.04 to about 1.07, or about 1.07 to about 1.14.

In various embodiments, the oligomeric phosphonates may react with the epoxy. For example, a chemical reaction may occur between the phosphonate groups of the oligomeric phosphonates and the epoxy ring and secondary hydroxyl groups of the epoxy resin. This reaction occurs during the curing cycle (at temperatures >150° C.), producing a crosslinked epoxy system with high glass transition temperature, typically greater than 160° C.

Embodiments of the invention are not limited by the type of oligophosphonate, co-oligo(phosphonate ester), or co-oligo(phosphonate carbonate), and in certain embodiments, the oligophosphonate, co-oligo(phosphonate ester), or co-oligo(phosphonate carbonate) may have the structures described and claimed in U.S. Pat. Nos. 6,861,499, 7,816,486, 7,645,850, and 7,838,604 and U.S. Publication No. 2009/0032770, each of which are hereby incorporated by reference in their entireties. Briefly, such oligomers may include repeating units derived from diaryl alkylphosphonates or diaryl arylphosphonates. For example, in some embodiments, such phosphonate oligomers include structural units illustrated by Formula I:

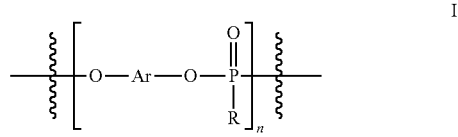

where Ar is an aromatic group and —O—Ar—O— may be derived from a dihydroxy compound having one or more, optionally substituted, aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, 3,3,5-trimethylcyclohexyldiphenol, or combinations of these, R is a $C_{1-20}$ alkyl, $C_{2-20}$ alkene, $C_{2-20}$ alkyne, $C_{5-20}$ cycloalkyl, or $C_{6-20}$ aryl, and n is an integer from 1 to about 20, 1 to about 10, or 2 to about 5, or any integer between these ranges.

In other embodiments, the co-oligo(phosphonate carbonate), or co-oligo(phosphonate ester), may have structures such as, but not limited to, those structures of Formulae II and III, respectively:

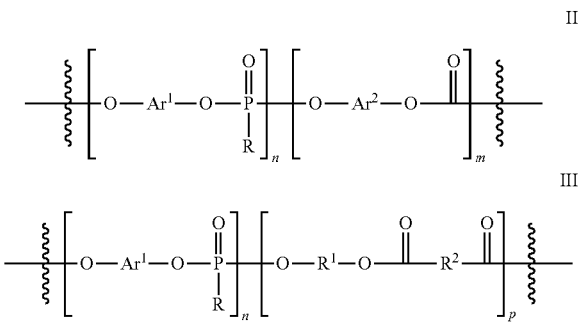

and combinations thereof, where Ar, $Ar^1$, and $Ar^2$ are each, independently, an aromatic group and —O—Ar—O— may be derived from a dihydroxy compound having one or more, optionally substituted aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, 3,3,5-trimethylcyclohexyldiphenol, or combinations of these, R is a $C_{1-20}$ alkyl, $C_{2-20}$ alkene, $C_{2-20}$ alkyne, $C_{5-20}$ cycloalkyl, or $C_{6-20}$ aryl, $R^1$ and $R^2$ are aliphatic or aromatic hydrocarbons, and each m, n, and p can be the same or different and can, independently, be an integer from 1 to about 20, 1 to about 10, or 2 to about 5, or any integer between these ranges. In certain embodiments, each m, n and p are about equal and generally greater than 5 or less than 15.

As indicated by the term "random" the monomers of the "random co-oligo(phosphonate carbonate)s" or "random co-oligo(phosphonate ester)s of various embodiments are incorporated into polymer chain randomly, such that the oligomeric phosphonate chain can include alternating phosphonate and carbonate or ester monomers or short segments in which several phosphonate or carbonate or ester monomers are linked by an aromatic dihydroxide. The length of such segments may vary within individual random co-oligo(phosphonate carbonate)s or co-oligo(phosphonate ester).

In particular embodiments, the Ar, $Ar^1$, and $Ar^2$ may be bisphenol A and R may be a methyl group providing oligomeric phosphonates having reactive end-groups including random and block co-oligo(phosphonate carbonate)s and co-oligo(phosphonate ester)s. Such compounds may have structures such as, but not limited to, structures of Formulae IV, V, and IV:

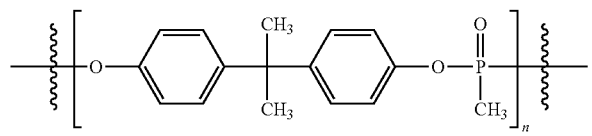

IV

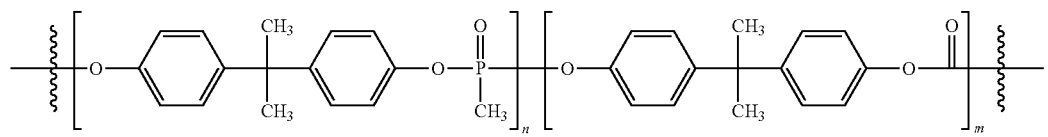

V

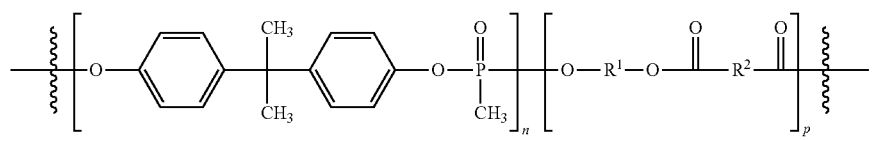

VI and combinations thereof, where each of m, n, p, and $R^1$ and $R^2$ are defined as described above. Such co-oligo(phosphonate ester), or co-oligo(phosphonate carbonate) may be block co-oligo(phosphonate ester), block co-oligo(phosphonate carbonate) in which each m, n, and p is greater than about 1, and the copolymers contain distinct repeating phosphonate and carbonate blocks or phosphonate and ester blocks. In other embodiments, the oligomeric co-oligo (phosphonate ester) or co-oligo(phosphonate carbonate) can be random copolymers in which each m, n, and p can vary and may be from n is an integer from 1 to about 20, 1 to about 10, or 2 to about 5, where the total of m, n, and p is an integer from 1 to about 20, 1 to about 10, or 2 to about 5 or any integer between these ranges.

With particular regard to co-oligo(phosphonate ester)s, co-oligo(phosphonate carbonate)s, block co-oligo(phosphonate ester)s, and block co-oligo(phosphonate carbonate)s, without wishing to be bound by theory, oligomers containing carbonate components, whether as carbonate blocks or randomly arranged carbonate monomers, may provide improved toughness over oligomers derived solely from phosphonates. Such co-oligomers may also provide higher glass transition temperature, $T_g$, and better heat stability over phosphonate oligomers.

The co-oligo(phosphonate carbonate)s of certain embodiments may be synthesized from at least 20 mole % diaryl alkylphosphonate or optionally substituted diaryl alkylphosphonate, one or more diaryl carbonate, and one or more aromatic dihydroxide, wherein the mole percent of the high purity diaryl alkylphosphonate is based on the total amount of transesterification components, i.e., total diaryl alkylphosphonate and total diaryl carbonate. Likewise, co-oligo (phosphonate ester)s of certain embodiments may be synthesized from at least 20 mole % diaryl alkylphosphonate or optionally substituted diaryl alkylphosphonate, one or more diaryl ester, and one or more aromatic dihydroxide, wherein the mole percent of the high purity diaryl alkylphosphonate is based on the total amount of transesterification components.

The phosphonate and carbonate content of the oligomeric phosphonates, random or block co-oligo(phosphonate carbonate)s and co-oligo(phosphonate ester)s may vary among embodiments, and embodiments are not limited by the phosphonate and/or carbonate content or range of phosphonate and/or carbonate content. For example, in some embodiments, the co-oligo(phosphonate carbonate)s or co-oligo(phosphonate ester)s may have a phosphorus content, of from about 1% to about 12% by weight of the total oligomer, and in other embodiments, the phosphorous content may be from about 2% to about 10% by weight of the total oligomer.

Hyperbranched oligomers of various embodiments have a highly branched structure and a high degree of functionality (i.e., chemical reactivity). The branched structure of such hyperbranched oligomers creates a high concentration of terminal groups, one at the end of nearly every branch that can include a reactive functional group such as hydroxyl end groups, epoxy end groups, vinyl end groups, vinyl ester end groups, isopropenyl end groups, isocyanate end groups, and the like. In some embodiments, the hyperbranched oligomers may have a unique combination of chemical and physical properties when compared to linear oligomeric phosphonates. For example, the high degree of branching can prevent crystallization and can render chain entanglement unlikely, so the hyperbranched oligomers can exhibit solubility in organic solvents and low solution viscosity and melt viscosity especially when sheared.

In some embodiments, the hyperbranched oligomers can contain branches that are not perfectly (i.e., absolutely regular) arranged. For example, various branches on a single hyperbranched oligomer may have different lengths, functional group composition, and the like and combinations thereof. Consequently, in some embodiments, the hyperbranched oligomers of the invention can have a broad molecular weight distribution. In other embodiments, the hyperbranched oligomers of the invention may be perfectly branched, including branches that are nearly identical, and have a monodisperse molecular weight distribution.

The degree of branching for the hyperbranched oligomers of the invention can be defined as the number average fraction of branching groups per molecule, i.e., the ratio of terminal groups plus branch monomer units to the total number of terminal groups, branch monomer units, and linear monomer units. For linear oligomers, the degree of branching as defined by the number average fraction of branching groups per molecule is zero, and for ideal dendrimers, the degree of branching is one. Hyperbranched oligomers can have a degree of branching which is intermediate between that of linear oligomers and ideal dendrimers. For example, a degree of branching for hyperbranched oligomers may be from about 0.05 to about 1, about 0.25 to about 0.75, or about 0.3 to about 0.6, and in certain embodiments, the hyperbranched oligomers may have a number average fraction of branching groups about 0.5.

The hyperbranched oligomers of the invention may be generically represented by the following structure Formula VII:

VII where B is the hyperbranched oligomer and w is the number of branches, v is an integer that is not zero, L is a linking group, and F is a reactive group.

The linking group (L) can be any moiety compatible with the chemistry of the monomers for the oligophosphonate, co-oligo(phosphonate ester), or co-oligo(phosphonate carbonate) described above. For example, in some embodiments, L can be any unit derived from an aryl or heteroaryl group including single aryl groups, biaryl groups, triaryl groups, tetraaryl groups, and so on. In other embodiments, L can be a covalent bond linking a functional group (F) directly to the hyperbranched oligomer, and in still other embodiments, L can be a $C_1$-$C_{10}$ alkyl, $C_2$-$C_{10}$ alkene, or $C_2$-$C_{10}$ alkyne that may or may not be branched.

The linking group (L) allows for attachment of one or more functional groups (F) to each branch termination of the hyperbranched oligomer. In some embodiments, each branch termination may have an attached linking group, and in other embodiments, one or more branch terminations of the hyperbranched oligomer (B) may not have an attached linking group. Such branch terminations without an attached linking group may terminate in a hydroxyl group or phenol group associated with the monomeric units of the hyperbranched oligomer. For branch terminations that include a linking group (L), each linking group may have from 0 to 5 or more associated functional groups. Thus, in some embodiments, one or more linking group of the reactive hyperbranched oligomer may have no attached functional groups, such that the branch termination associated with this linking group is substantially unreactive. In other embodiments, one or more linking group of the reactive hyperbranched oligomer may have one or more attached functional groups providing a branch termination that is potentially reactive with other monomers, oligomers, or polymers, and in still other embodiments, one or more linking groups of the reactive hyperbranched oligomer can have multiple attached functional groups. For example, two of the aryl groups associated with a triaryl group may include a functional group (F) with the third aryl group attaching the linking group to the hyperbranched polymer or oligomer. The functional group (F) may vary among embodiments and can be any chemical moiety capable of reacting with another chemical moiety. Non-limiting examples of functional groups (F) include hydroxyl, carboxylic acid, amine, cyanate, isocyanate, epoxy, glycidyl ether, vinyl, and the like and combinations thereof. The reactive hyperbranched oligomers of the present invention are reactive with a variety of functional groups such as epoxies, anhydrides, activated halides, carboxylic acids, carboxylic esters, isocyanates, aldehydes, vinyls, acetylenes, and silanes. These groups may be present on another monomer, oligomer, or polymer used in the preparation of a polymer composition.

The hyberbranched oligomer portion (B) of the general structure presented above may be any phosphonate containing hyperbranched oligomer. For example, in some embodiments, such hyperbranched oligomers may include repeating units derived from diaryl alkyl- or diaryl arylphosphonates, and certain embodiments, such hyperbranched oligomers may have a structure including units of Formula I:

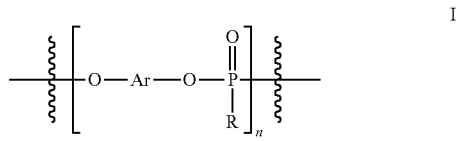

I where Ar is an aromatic group and —O—Ar—O— may be derived from a compound having one or more, optionally substituted, aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, 3,3,5-trimethylcyclohexyldiphenol, or combinations of these, R is a $C_{1-20}$ alkyl, $C_{2-20}$ alkene, $C_{2-20}$ alkyne, $C_{5-20}$ cycloalkyl, or $C_{6-20}$ aryl, and n is an integer from 1 to about 20, 1 to about 10, or 2 to about 5, or any integer between these ranges.

The hyperbranched oligomers (B) of such embodiments may further include units derived from branching agents or multifunctional aryl multifunctional biaryl groups, multifunctional triaryl groups, multifunctional tetra aryl, and so on. In some embodiments, the units derived from branching agents may be derived from, for example, polyfunctional acids, polyfunctional glycols, or acid/glycol hybrids. In other embodiments, the hyperbranched oligomeric phosphonates may have units derived from tri or tetrahydroxy aromatic compounds or triaryl or tetraaryl phosphoric acid esters, triaryl or tetraaryl carbonate or triaryl or tetraaryl esters or combinations thereof such as, but not limited to, trimesic acid, pyromellitic acid, trimellitic anhydride, pyromellitic anhydride, trimethylolpropane, dimethyl hydroxyl terephthalate, pentaerythritol, and the like and combinations thereof. Such branching agents provide branch points within the hyperbranched oligomeric phosphonate. In particular embodiments, the branching agent may be a triaryl phosphate such as, for example, those of Formula VIII:

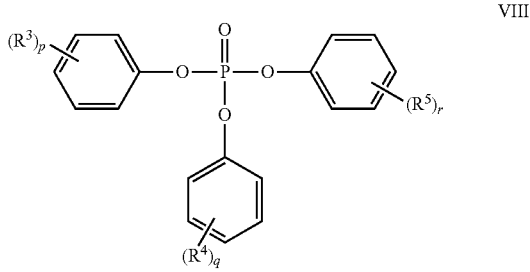

VIII where each $R^3$, $R^4$, and $R^5$ can, independently, be a hydrogen, $C_1$-$C_4$ alkyl of, and each of p, q, and r are independently integers of from 1 to 5.

The number of branches (w) may be directly proportional to the number of units derived from a branching agent and may be any integer from about 2 to about 20. In some embodiments, n may be an integer greater than 3, greater than 5, or greater than 10 or any value within these ranges, and in other embodiments, n may be from about 5 to about 20, about 5 to about 15, about 5 to about 10, or any value between these ranges.

The reactive hyperbranched phosphonates of certain embodiments may have a structure in which B is of Formula IX or Formula X:

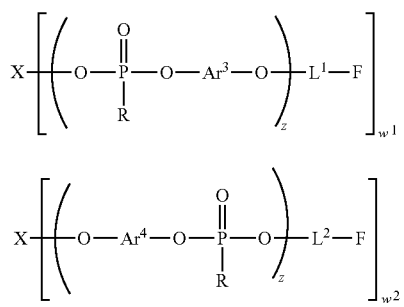

where each $Ar^3$ and $Ar^4$ are, independently, an aromatic group and —O—$Ar^3$—O— and —O—$Ar^4$—O— can be derived from a dihydroxy compound having one or more, optionally substituted, aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, 3,3,5-trimethylcyclohexyldiphenol, or combinations of these, each $L^1$ and $L^2$ are, independently, a covalent bond or an aryl or heteroaryl group including single aryl groups, biaryl groups, triaryl groups, tetraaryl groups, and so on, R can be a $C_{1-20}$ alkyl, $C_{2-20}$ alkene, $C_{2-20}$ alkyne, $C_{5-20}$ cycloalkyl, or $C_{6-20}$ aryl, z is an integer from 1 to about 20, 1 to about 10, or 2 to about 5, or any integer between these ranges, and each $w^1$ and $w^2$ are, independently, 1 to 5. X may be derived from any branching agent described above. In some embodiments, X in an individual B may be the same molecule, such that branches having a structure of Formula VII and Formula VII may extend from the same branching agent (X) molecule. In particular embodiments, X may be an triarylphosphate of Formula VIII as described above. In other embodiments, two or more X may be linked as illustrated in Formula XI, Formula XII, or Formula XIIII:

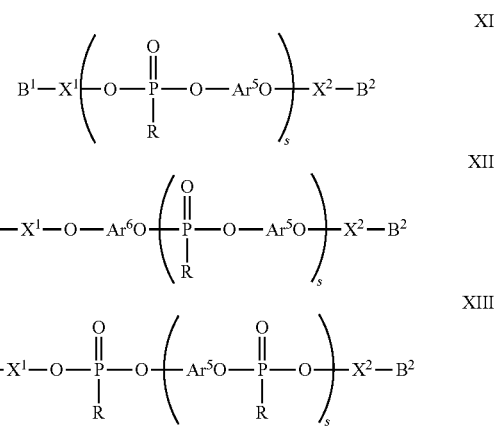

where each $B^1$ and $B^2$ are, independently, hyperbranched polymers as described above, each $X^1$ and $X^2$ are, independently, branching agents as described above, each $Ar^5$ and $Ar^6$ are, independently, an aromatic group and —O—$Ar^5$—O— and —O—$Ar^6$—O— can be derived from a dihydroxy compound having one or more, optionally substituted, aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, 3,3,5-trimethylcyclohexyldiphenol or combinations of these, each R is as defined as above, and s is an integer of from 1 to about 20, 1 to about 10, or 2 to about 5, or any integer therebetween. In various embodiments, an individual reactive hyperbranched oligomer may have a structure in which portions of the oligomer can be any of Formula I, and VIII to XIII. Thus, embodiments encompass reactive hyperbranched oligomers in having any combination of the Formulae provided above. In other embodiments, a reactive hyperbranched oligomer may be composed of substantially one or two structures of the Formulae presented above. For example, a hyperbranched oligomer may be composed of two units derived from branching agents (X) linked by a structure of Formula XI with branches of Formula IX, or a hyperbranched oligomer may be composed of three or four branching agents linked by structures of Formulae XI and XIII with branches of structure Formula IX. Of course as discussed above, any combination of Formulae are possible and could be present in a single reactive hyperbranched oligomer.

An exemplary representation of a reactive hyperbranched oligomer of the invention is provided below:

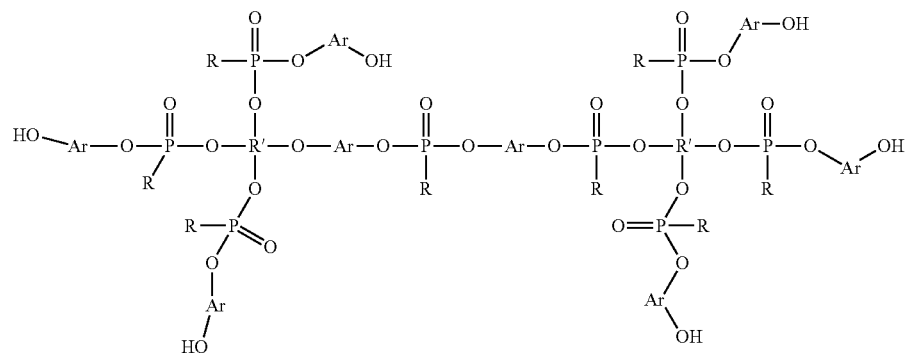

where Ar is an aryl or heteroaryl group, R is a $C_1$-$C_4$ alkyl group or an aryl group, and R' is an alkyl or aromatic group derived from a branching agent.

The phosphonate and carbonate content of the hyperbranched oligomeric phosphonates, random or block co-oligo(phosphonate carbonate)s, and co-oligo(phosphonate ester)s may vary among embodiments, and embodiments are not limited by the phosphonate and/or carbonate content or range of phosphonate and/or carbonate content. For example, in some embodiments, the co-oligo(phosphonate carbonate)s or co-oligo(phosphonate ester)s may have a phosphorus content, of from about 2% to about 12% by weight, 2% to about 10% by weight, or less than 10% by weight of the total oligomer.

The reactive hyperbranched oligomers of various embodiments may have greater than about 40% or greater than about 50% reactive end groups based on the total number of branch terminations as determined by known titration methods. In certain embodiments, the reactive hyperbranched oligomers may have greater than about 75% or greater than 90% of the reactive end groups based on the total number of branch terminations as determined by titration methods. In further embodiments, the reactive hyperbranched oligomers may have from about 40% to about 98% reactive end groups, about 50% to about 95% reactive end groups, or from about 60% to about 90% end groups based on the total number of branch terminations. As discussed above individual branch terminations may have more than one reactive end group. Therefore, in some embodiments, the reactive hyperbranched oligomers may have greater than 100% reactive end groups. As discussed above, the term "reactive end groups" is used to describe any chemical moiety at a branch termination that is capable of reacting with another chemical moiety. A large number of reactive functional groups are known in the art and encompassed by the invention. In particular embodiments, the reactive end groups may be hydroxyl, epoxy, vinyl, or isocyanate groups.

Without wishing to be bound by theory, due to their hyperbranched nature, the reactive hyperbranched oligomers of the invention may exhibit low melt viscosities when sheared as compared to linear oligomeric phosphonates. Thus, the reactive hyperbranched oligomers described herein can be blended with monomers, oligomers, and polymers without diminishing melt processability. The hyperbranched oligophosphonates of various embodiments, therefore, can provide better meltability and improved processing. In addition, the reactive hyperbranched oligomers of the invention may be of higher molecular weight and provide greater reactivity increasing the crosslinking and improving the toughness of polymer compositions over similar compositions prepared using linear oligomeric phosphonates. In some embodiments, the reactive hyperbranched oligomers of the invention may be used as reactive or non-reactive additives in thermoplastics to improve shear thinning. For example, hyperbranched oligomers may be prepared that have no or very few reactive end groups that can be used to improve shear thinning without reacting, or crosslinking, the polymer to which the oligomers are added.

The oligomeric phosphonates of various embodiments including linear and hyperbranched oligophosphonates can exhibit a high molecular weight and/or a narrow molecular weight distribution (i.e., low polydispersity). For example, in some embodiments, the oligomeric phosphonates may have a weight average molecular weight (Mw) of about 1,000 g/mole to about 18,000 g/mole as determined by $\eta_{rel}$ or GPC, and in other embodiments, the oligomeric phosphonates may have a Mw of from about 1,000 to about 15,000 g/mole as determined by $\eta_{rel}$ or GPC. The number average molecular weight (Mn), in such embodiments, may be from about 1,000 g/mole to about 10,000 g/mole, or from about 1,000 g/mole to about 5,000 g/mole, and in certain embodiments the Mn may be greater than about 1,200 g/mole. The narrow molecular weight distribution (i.e., Mw/Mn) of such oligomeric phosphonates may be from about 1 to about 7 in some embodiments and from about 1 to about 5 in other embodiments. In still other embodiments, the co-oligo(phosphonate carbonate)s may have a relative viscosity ($\eta_{rel}$) of from about 1.01 to about 1.20. Without wishing to be bound by theory, the relatively high molecular weight and narrow molecular weight distribution of the oligomeric phosphonates of the invention may impart a superior combination of properties. For example, the oligomeric phosphonates of embodiments are extremely flame retardant and exhibit superior hydrolytic stability and can impart such characteristics on a polymer combined with the oligomeric phosphonates to produce polymer compositions such as those described below. In addition, the oligomeric phosphonates of embodiments, generally, exhibit an excellent combination of processing characteristics including, for example, good thermal and mechanical properties.

The concentration of oligomeric phosphonates in the compositions of various embodiments may vary and any concentration that provides a suitable combination of glass transition temperature, heat resistance, and flame retardancy can be used. For example, in some embodiments, the compositions described above may include about 5 percent by weight (wt. %) to about 60 wt. %. In other embodiments, the compositions described above may include about 10 wt. % to about 50 wt. %, about 15 wt. % to about 45 wt. %, about 20 wt. % to about 40 wt. %, or any individual concentration or range of concentrations encompassed by these example ranges.

The compositions of various embodiments are not limited to any particular carbodiimide and any carbodiimide or combination of carbodiimides can be incorporated into the compositions described above. Examples of useful carbodiimides include, but are not limited to, N,N'-di-2,6-diisopropylphenylcarbodiimide, N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylene-bis-di-o-tolylcarbodiimide, p-phenylene-bis-dicyclohexylcarbodiimide, hexamethylene-bis-dicyclohexylcarbodiimide, 4,4'-dicyclohexylmethanecarbodiimide, ethylene-bis-diphenylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6- triisopropylphenylcarbodiimide, N,N'-di-2,4,6-triisobutylphenylcarbodiimide, diisopropylcarbodiimide, dimethylcarbodiimide, diisobutylcarbodiimide, dioctylcarbodiimide, t-butylisopropylcarbodiimide, di-β-naphthylcarbodiimide, di-t-butylcarbodiimide, and aromatic polycarbodiimides, and polymers of these compounds. In certain embodiments, the carbodiimides may be aromatic carbodiimides such as, for example, N,N'-di-2,6-diisopropylphenylcarbodiimide, or carbodiimides having one or more cyclo-rings such as, for example, 4,4'-dicyclohexylmethanecarbodiimide or polymers of these compounds. In particular embodiments, the carbodiimide may be N,N'-dicyclohexylcarbodiimide, N-cyclohexyl-N'-(2-morpholinoethyl)carbodiimide metho-p-toluenesulfonate, bis(trimethylsilyl)carbodiimide, N-(3-dimethylaminopropyl)-N'-ethylcarbodiimide, N-(3-dimethylaminopropyl)-N'-ethylcarbodiimide hydrochloride, 1,3-di-p-tolylcarbodiimide, N,N'-bis(2-methylphenyl)carbodiimide, N-(tert-butyl)-N'-[1-(2-chlorophenyl)-1-methylethyl]carbodiimide, N-(tert-butyl)-N'-(2,6-dichlorophenyl)carbodiimide, N-butyl-N'-[1-(2-chlorophenyl)-1-methyl ethyl]carbodiimide, N,N'-diisopropylcarbodiimide, dicyclohexylcarbodiimide, N-benzyl-N'-cyclohexylcarbodiimide.

The concentration of carbodiimides in the compositions of various embodiments may vary and any concentration that provides a suitable combination of glass transition temperature, heat resistance, and flame retardancy can be used. For example, in some embodiments, the compositions described above may include about 0.01 percent by weight (wt. %) to about 4.0 wt. %. In other embodiments, the compositions described above may include about 0.05 wt. % to about 3 wt. %, about 0.1 wt. % to about 2 wt. %, about 0.5 wt. % to about 1.0 wt. %, or any individual concentration or range of concentrations encompassed by these example ranges.

The phenolic antioxidants and phosphite antioxidants in the compositions described above may be any phenolic antioxidants, phosphite antioxidants, or combination of phenolic antioxidants and phosphite antioxidants known in the art including, for example, sterically hindered phenolic antioxidants, hydrolytically stable organophosphites, organophosphite antioxidants, sterically hindered lactone antioxidants, and the like. Sterically hindered phenolic antioxidants, organophosphite antioxidants, hydrolytically stable organophosphites and sterically hindered lactone and amine antioxidants represent broad classes of additives that can encompass many similar chemical structures. Particular examples of such antioxidants are provided in Table 1.

TABLE 1

| Chemical Structure | CAS Reg. Num. |
|---|---|
| 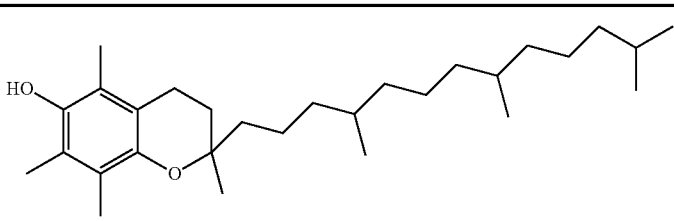 | 10191-41-0 |
| 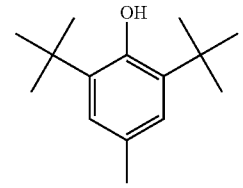 [SMILES: Cc1cc(C(C)(C)C)c(O)c(C(C)(C)C)c1] | 128-37-0 |
| 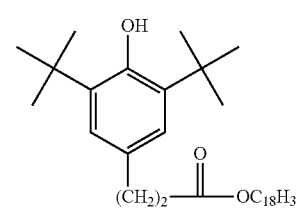 | 2082-79-3 |
| 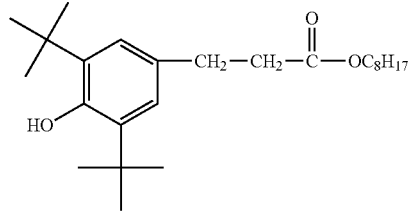 | 12643-61-0 |

TABLE 1-continued

| Chemical Structure | CAS Reg. Num. |
|---|---|
| 2,2'-methylenebis(6-tert-butyl-4-methylphenol) | 119-47-1 |
| bis[3-(3,5-di-tert-butyl-4-hydroxyphenyl)propionate] ester with (CH$_2$)$_3$ | 35074-77-2 |
| N,N'-bis[3-(3,5-di-tert-butyl-4-hydroxyphenyl)propionamide] with (CH$_2$)$_3$ | 23128-74-7 |
| diethyl (3,5-di-tert-butyl-4-hydroxybenzyl)phosphonate derivative | 976-56-7 |
| calcium bis[monoethyl(3,5-di-tert-butyl-4-hydroxybenzyl)phosphonate] | 65140-91-2 |
| bis[3-(3-tert-butyl-4-hydroxy-5-methylphenyl)propionate-(CH$_2$)$_2$-O-CH$_2$]$_2$ | 36443-68-2 |
| 4,4'-butylidenebis(2-tert-butyl-5-methylphenol) | 85-60-9 |

TABLE 1-continued

| Chemical Structure | CAS Reg. Num. |
|---|---|
| | 90498-90-1 |
| | 1709-70-2 |
| | 1843-03-4 |
| | 34137-09-2 |

TABLE 1-continued
| Chemical Structure | CAS Reg. Num. |
|---|---|
| 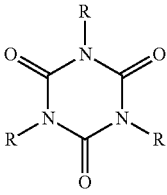 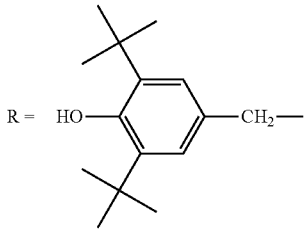 | 27676-62-6 |
| 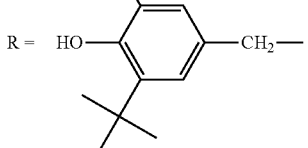 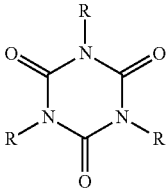 | 40601-76-1 |
| 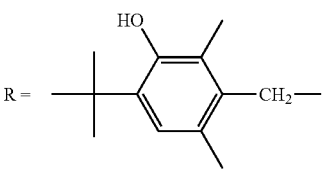 | 6683-19-8 |
| 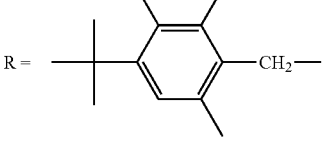 | 6683-19-8 |

TABLE 1-continued

| Chemical Structure | CAS Reg. Num. |
|---|---|
| (structure) | 31851-03-3 |
| (structure) | 134701-20-5 |
| (structure) | 96-69-5 |
| (structure) | 90-66-4 |
| (structure) | 110553-27-0 |
| (structure) | 41484-35-9 |

TABLE 1-continued

| Chemical Structure | CAS Reg. Num. |
|---|---|
| 3,5-di-tert-butyl-4-hydroxyphenyl-NH-triazine with two SC₈H₁₇ groups | 991-84-4 |
| HO-C₆H₄-NH-C(=O)-C₁₇H₃₅ | 103-99-1 |
| Bis[3,5-di-tert-butyl-4-hydroxyphenyl-CH₂-CH(C₄H₉)-C(=O)-O-(2,2,6,6-tetramethylpiperidin-4-yl)]-N-CH₃ | 63843-89-0 |
| 3,5-di-tert-butyl-4-hydroxybenzoate of 2,4-di-tert-butylphenol | 4221-80-1 |
| 3,5-di-tert-butyl-4-hydroxybenzoate of C₁₆H₃₃ | 67845-93-6 |
| 3-hydroxyphenyl benzoate | 136-36-7 |
| 2,2'-methylenebis(6-tert-butyl-4-methylphenol) acrylate | 61167-58-6 |

TABLE 1-continued
| Chemical Structure | CAS Reg. Num. |
|---|---|
| 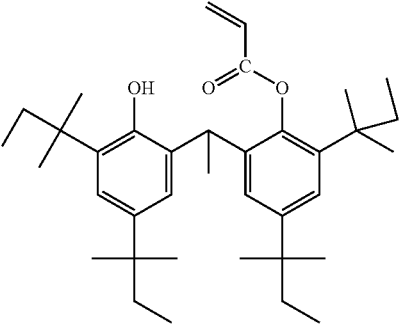 [SMILES: C=CC(=O)Oc1c(C(C)c2cc(C(C)(C)CC)cc(C(C)(C)CC)c2O)cc(C(C)(C)CC)cc1C(C)(C)CC] | 128961-68-2 |
| 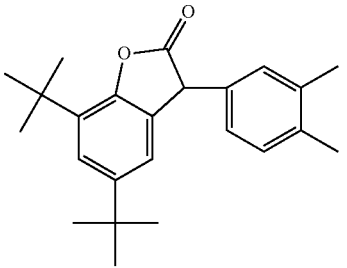 [SMILES: Cc1ccc(C2C(=O)Oc3c2cc(C(C)(C)C)cc3C(C)(C)C)cc1C] | 181314-48-7 |
| 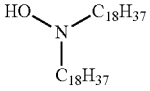 | 143925-92-2 |
| 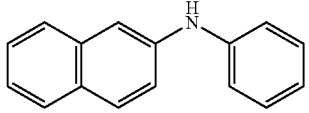 [SMILES: c1ccc(Nc2ccc3ccccc3c2)cc1] | 135-88-6 |
| 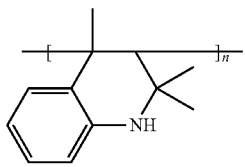 | 26780-96-1 |
| 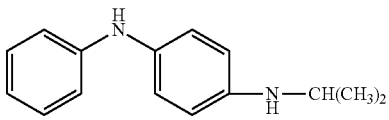 [SMILES: CC(C)Nc1ccc(Nc2ccccc2)cc1] | 101-72-4 |
| 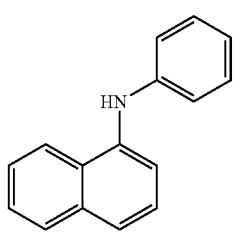 [SMILES: c1ccc(Nc2cccc3ccccc23)cc1] | 90-30-2 |
| 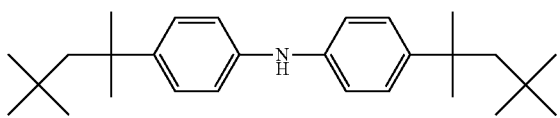 | 68411-46-1 |

TABLE 1-continued

| Chemical Structure | CAS Reg. Num. |
|---|---|
| (structure) | 10081-67-1 |
| (structure) | 118832-72-7 |
| (structure) | 26523-78-4 |
| (structure) | 31570-04-4 |
| (structure) | 26741-53-7 |
| (structure) | 80693-00-1 |

In particular embodiments, the antioxidant may be a hindered phenol such as, for example, octadecyl-3-(3,5-di-tert-butyl-4-hydroxyphenyl)propionate, N,N'-hexane-1,6-diylbis(3-(3,5-di-tert-butyl-4-hydroxyphenylpropionamide)), 3,3',3',5,5',5'-hexa-tert-butyl-a,a',a'-(mesitylene-2,4,6-triyl)tri-p-cresol, 4,6-bis(octylthiomethyl)-o-cresol, and the like. In some embodiments, the antioxidant may be a phosphite antioxidant such as, for example, bis(2,4-ditert-butylphenyl)pentaerytritol diphosphite, tris(2,4-ditert-butylphenyl)phosphite. In particular embodiments, the antioxidant may be a combination of these hindered phenols and phosphite antioxidants.

The concentration of phenolic antioxidants and phosphite antioxidants in the compositions of various embodiments may vary and any concentration that provides a suitable combination of glass transition temperature, heat resistance, and flame retardancy can be used. For example, in some embodiments, the compositions described above may include about 0.01 wt. % to about 1.0 wt. %. In other embodiments, the compositions described above may include about 0.05 wt. % to about 0.75 wt. %, about 0.1 wt. % to about 0.5 wt. %, or any individual concentration or range of concentrations encompassed by these example ranges.

Any epoxy resin can be used in such embodiments, and in certain embodiments, the resin may contain glycidyl groups, alicyclic epoxy groups, oxirane groups, ethoxyline groups, or similar epoxy groups or combinations thereof that can react with epoxy groups associated with the epoxy containing phosphonate polymers, copolymers, oligomers and co-oligomers of this invention. Such epoxy resins are well known in the art and include, but are not limited to, novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylol-propane type epoxy resin, terpene-modified epoxy resin, linear aliphatic epoxy resin obtained by oxidizing olefin bonds with peracetic acid or a similar peracid, alicyclic epoxy resin, or sulfur-containing epoxy resin. In some embodiments, the epoxy resin may be composed of two or more epoxy resins of any of the aforementioned types. In particular embodiments, the epoxy resins may be aralkyl-type epoxy resins, such as epoxy resins derived from bisphenol A or 4,4'-methylene dianiline. The epoxy may also contain one or more additional components such as, for example, a benzoxazine compound or resin, and in some embodiments, the novel epoxy containing phosphonate monomers, polymers, copolymers, oligomers and co-oligomers may be used as epoxy modifiers, chain extenders or crosslinkers for epoxy resins, or epoxy hardeners in such epoxy resin polymer compositions.

The compositions described above additional components such as additives, fillers, and fibers, such as, but not limited to, chopped or continuous glass fiber, metal fibers, aramid fibers, carbon fibers, or ceramic fibers, surfactants, organic binders, polymeric binders, crosslinking agents, diluents, coupling agents, flame retardant agents, anti-dripping agents such as fluorinated polyolefins, silicones, and, lubricants, mould release agents such as pentaerythritol tetrastearate, nucleating agents, anti-static agents such as conductive blacks, carbon nanotubes, graphite, graphene, oxidized graphene, and organic antistatics such as polyalkylene ethers, alkylsulfonates, perfluor sulfonic acid, perfluorbutane, sulfonic acid potassium salt, and polyamide-containing polymers, catalysts, colorants, inks, dyes, antioxidants, stabilizers, and the like and any combinations thereof.

In such embodiments, the each of the additional components or additives may make up from about 0.001 wt. % to about 1 wt. %, about 0.005 wt. % to about 0.9 wt. %, about 0.005 wt. % to about 0.8 wt. %, or about 0.04 wt. % to about 0.8 wt. % of the total composition, and in particular embodiments, the additional components or additives may make up about 0.04 wt. % to about 0.6 wt. % based on the total composition. Additional components such as glass fiber, carbon fiber, organic fiber, ceramic fiber or other fillers may be provided at much concentrations up to 70 volume (vol.) %. For example, the polymer compositions of certain embodiments may include about 5 vol. % to about 70 vol. %, from about 10 vol. % to about 60 vol. %, or about 20 vol. % to about 50 vol. % glass fiber, carbon fiber, organic fiber, or ceramic fiber.

Polymer compositions including novel epoxy containing phosphonate monomers, polymers, copolymers, oligomers and co-oligomers and other engineering polymers and/or additional components or additives can be prepared by conventional means. For example, in some embodiments, the compositions may be prepared by liquid epoxy curing. Such embodiments may include the steps of combining the epoxy resin, oligomeric phosphonate, and carbodiimide antioxidant or combination of carbodiimides and phenolic antioxidants or phosphite antioxidants in a solvent, and in certain embodiments, the method may include the step of combining the epoxy resin, oligomeric phosphonate, carbodiimide antioxidant or combination of carbodiimides and phenolic antioxidants or phosphite antioxidants, and a curing catalyst in a solvent. Combining may be carried out by any means including, for example, stirring or shaking the components until a substantially homogeneous mixture of components has been created. In certain embodiments, the method may include the steps of combining the epoxy resin, oligomeric phosphonate, and carbodiimide antioxidant or combination of carbodiimides and phenolic antioxidants or phosphite antioxidants to create a mixture and adding the solvent or solvent and curing agent to the mixture. This mixture may be mixed by stirring or shaking.

The form of addition of the compounds according to the invention is not limited. For example, the engineering plastics and/or additional components or additives can be added as solids such as a powder, as concentrate in solution or as a liquid.

The solvent of such embodiments may be any solvent known in the art, and in certain embodiments, the solvent may be an aprotic solvent. Aprotic solvents can include, but are not limited to, perfluorohexane, a,a,a-trifluorotoluene, pentane, hexane, cyclohexane, methylcyclohexane, decalin [c+t], dioxane, carbon tetrachloride, freon-11, benzene, toluene, triethyl amine, carbon disulfide, diisopropyl ether, diethyl ether (ether), t-butyl methyl ether (MTBE), chloroform, ethyl acetate, 1,2-dimethoxyethane (glyme), 2-methoxyethyl ether (diglyme), tetrahydrofuran (THF), methylene chloride, pyridine (Py), methyl ethyl ketone (MEK), methyl n-amyl ketone (MAK), methyl n-propyl ketone (MPK), acetone, hexamethylphosphoramide, N-methylpyrrolidinone, nitromethane, dimethylformamide, acetonitrile, sulfolane, dimethyl sulfoxide, propylene carbonate, and the like. In certain embodiments, the solvent may be methyl ethyl ketone (MEK) or acetone.

The amount of solvent included in the mixtures of various embodiments may be from about 25 wt. % to about 75 wt. % of the total composition, and in certain embodiments, the solvent may be about 30 wt. % to about 50 wt. % of the total composition or any concentration or range encompassed by these example ranges.

Any curing agents and curing catalysts known in the art such as, but not limited to, transition metal catalysts, tertiary amines, imidazole containing compounds, and the like and combinations thereof. Examples of the tertiary amine curing catalysts include triethylamine, benzyldimethylamine, pyridine, picoline, 1,8-diazabiscyclo(5,4,0)undecene-1, dicyandiamide, and the like, and Examples of the imidazole compound include, but are not limited to 2-methylimidazole, 2-ethylimidazole, 2-undecylimidazole, 2-ethyl-4-methylimidazole, 2-phenyl-4,5-dihydroxymethylimidazole and the like.

The amount of the curing catalyst may be any amount that is effective for use as a catalyst and can, generally, be from about 0.01 wt. % to about 20 wt. % based on the weight of the total composition. In some embodiments, the amount of curing catalyst may be, about 0.1 wt. % to about 15 wt. %, about 0.5 wt. % to about 10 wt. %, about 1.0 wt. % to about 5 wt. %, or any range or individual concentration encompassed by these example ranges.

The method may further include heating the mixture after the mixture has been mixed to form a substantially homogenous mixture to remove the solvent and produce a cured composition. Heating can be carried out at any suitable temperature that allows for good catalytic activity and evaporation of the solvent. In various embodiments, heating may be carried out to from about 20° C. to about 250° C., about 50° C. to about 200° C., about 100° C. to about 150° C., or any range or individual temperature encompassed by these ranges. In certain embodiments, heating may be carried out in two or more steps. For example, a first heating step may include heating the mixture to a temperature suitable for evaporating the solvent such as, for example, about 40° C. to about 150° C. or about 50° C. to about 100° C. for a first time period, and a second heating step may including heating the mixture to a temperature suitable for curing the mixture such as, for example, about 100° C. to about 250° C. or about 150° C. to about 200° C. The time period for heating may vary among embodiments and may vary depending on the type of solvent used. Typically, heating may be carried out from about 60 minutes to about 300 minutes or any range or individual time period encompassed by this range. In embodiments in which heating is carried out for a first and second time period, a first heating step may be carried out for about 10 minutes to about 60 minutes, about 20 minutes to about 40 minutes or about 30 minutes, and a second heating step may be carried out from about 40 minutes to about 200 minutes or about 60 minutes to about 180 minutes or any range or individual time period encompassed by this range.

The polymer compositions of various embodiments can be used in any application in which a flame retardant polymer is useful. For example, in some embodiments, the polymer compositions of the invention may be used as coatings on plastics, metals, glass, carbon, ceramic, or wood products which can be in a variety of forms, for example as a fiber, woven mat, nonwoven mat, cloth, broadgood, fabric, molding, laminate, foam, extruded shape or the like, and in other embodiments, the polymer compositions of the invention can be used in adhesives or to fabricate sheets, multi-layer sheets, free-standing films, multi-layer films, fibers, foams, molded articles, and fiber reinforced composites. Such articles may be well-suited for applications requiring flame resistance. The novel epoxy containing phosphonate monomers, polymers, copolymers, oligomers and co-oligomers and polymers therefrom, and polymer compositions of the invention, may exhibit outstanding flame resistance and good melt processability making these materials useful in applications for the automotive, construction, and electronic sectors that require outstanding fire retardancy, high temperature performance, and melt processability. In addition, these articles may be well suited for a variety of applications as support parts, electrical components, electrical connectors, printed wiring laminated boards, flexible or rigid circuit boards, electrical or electromagnetic housings, electrical or electromagnetic subcomponents and components in consumer products that must meet UL or other standardized fire resistance standards and environmental standards.

In some embodiments, the polymer compositions of the invention may be combined with other components or reinforcing materials. For example, in various embodiments, continuous or chopped glass fibers, carbon black or carbon fibers, ceramic particles or fibers, organic fibers, or other organic materials may be included in the polymers and polymer compositions of the invention. In particular embodiments, continuous or chopped glass fibers, carbon fibers, ceramic fibers, organic fibers, or other organic materials may be combined with the novel epoxy containing phosphonate monomers, polymers, copolymers, oligomers and co-oligomers and polymers therefrom, and polymer compositions of the invention to create a prepreg to prepare laminates. Such laminates may be used to fabricate components such as flexible or rigid laminated circuit boards that can be incorporated into articles of manufacture such as electronic goods such as, for example, televisions, computers, laptop computers, tablet computers, printers, cell phones, video games, DVD players, stereos and other consumer electronics.

The polymer compositions of the invention are generally self-extinguishing, i.e., they stop burning when removed from a flame and any drops produced by melting in a flame stop burning are almost instantly extinguishes and do not readily propagate fire to any surrounding materials. Moreover, these polymer compositions do not evolve noticeable smoke when a flame is applied.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples. The following examples are for illustrative purposes only and are not to be construed as limiting the invention in any manner.

Materials

Two hydroxyl terminated alkyl phosphonate oligomer (Nofia® OL1001 and Nofia® OL3001, manufactured by FRX Polymers®, Inc.) and a cresol novolac epoxy resin (Epon 164, manufactured by Momentive, Epoxide Equivalent Weight of 200~240 g/eq.) were prepared.

2-ethyl-4-methylimidazole and dicyandiamide were purchased from Sigma-Aldrich. An alkylphenyl carbodiimide and its polymeric type were purchased from RheinChemie (Stabaxol® 1 and Stabaxol® P). Pentaerythritol tetrakis[3-(3',5'-di-tert-butyl-4'-hydroxyphenyl)propionate], bis(2.4-di-t-butylphenyl)pentaerythritol diphosphite, and tris(2,4-ditert-butylphenyl) phosphite were purchased from Sigma-Aldrich.

Methods

GPC: Molecular weight distributions were determined by measuring 0.2% solutions of polymer in tetrahydrofuran by gel permeation chromatography (GPC) with UV detection (at 254 nm). Calibration of the instrument was conducted with linear polystyrene (PS) standards of known molecular weights. The weight average (Mw), number average (Mn) and polydispersity (Mw/Mn), referred to as PD, were evaluated from the chromatograms by using WinGPC.

DSC: Glass transition temperatures (Tg) were measured using TA Instrument Q20 according to a Drying cycle 1) Ramp 10° C./min up to 130° C. 2) Equilibrate at 130° C. 3) Quench to 0° C. 4) Equilibrate at 0° C., and a Test cycle 5) Ramp 10° C./min up to 250° C. 6) End of test.

Comparative Example 1

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL1001, manufactured by FRX Polymers, molecular weight (Mn) of 1,500 g/mole), and 0.2 parts by weight of 2-ethyl-4-methylimidazole solution (10% in methyl ethyl ketone) were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 190° C. for every 60 minutes up to 180 minutes. The glass transition temperature (Tg) of the cured epoxy resin was measured by using a differential scanning calorimeter (DSC) using TA Instrument Q20.

Comparative Example 2

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL1001, manufactured by FRX Polymers, molecular weight (Mn) of 1,500 g/mole), 0.2 parts by weight of 2-ethyl-4-methylimidazole solution (10% in methyl ethyl ketone), and 4 parts by weight of dicyandiamide were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 190° C. for every 60 minutes up to 180 minutes. The glass transition temperature (Tg) of the cured epoxy resin was measured by using a differential scanning calorimeter (DSC) using TA Instrument Q20.

Example 1

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL1001, manufactured by FRX Polymers, molecular weight (Mn) of 1,500 g/mole), 0.2 parts by weight of 2-ethyl-4-methylimidazole solution (10% in methyl ethyl ketone), and 1.0 parts by weight of Stabaxol® 1 were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 190° C. for every 60 minutes up to 180 minutes. The glass transition temperature (Tg) of the cured epoxy resin was measured by using a differential scanning calorimeter (DSC) using TA Instrument Q20.

Example 2

The same composition in Example 1 was prepared and the solution was poured into a mold and dried, followed by curing at 200° C. for 60 minutes and 120 minutes each. The glass transition temperature (Tg) of the cured epoxy resin was measured by using a differential scanning calorimeter (DSC).

Example 3

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL1001, manufactured by FRX Polymers, molecular weight (Mn) of 1,500 g/mole), 0.2 parts by weight of 2-ethyl-4-methylimidazole solution (10% in methyl ethyl ketone), and 2.0 parts by weight of Stabaxol® 1 were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 190° C. for every 60 minutes up to 180 minutes. The glass transition temperature (Tg) of the cured epoxy resin was measured by using a differential scanning calorimeter (DSC) using TA Instrument Q20.

Example 4

The same composition in Example 3 was prepared and the solution was poured into a mold and dried, followed by curing at 200° C. for 60 minutes and 120 minutes each. The glass transition temperature (Tg) of the cured epoxy resin was measured by using a differential scanning calorimeter (DSC).

Example 5

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL1001, manufactured by FRX Polymers, molecular weight (Mn) of 1,500 g/mole), 0.2 parts by weight of 2-ethyl-4-methylimidazole solution (10% in methyl ethyl ketone), and 1.0 parts by weight of pentaerythritol tetrakis[3-(3',5'-di-tert-butyl-4'-hydroxyphenyl)propionate] and 0.5 parts by weight of bis(2.4-di-t-butylphenyl)pentaerythritol diphosphite were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Example 6

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL1001, manufactured by FRX Polymers, molecular weight (Mn) of 1,500 g/mole), 0.2 parts by weight of 2-ethyl-4-methylimidazole solution (10% in methyl ethyl ketone), and 1.0 parts by weight of Stabaxol® 1, 1.0 parts by weight of pentaerythritol tetrakis[3-(3',5'-di-tert-butyl-4'-hydroxyphenyl)propionate], and 0.5 parts by weight of bis(2.4-di-t-butylphenyl) pentaerythritol diphosphite were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Example 7

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL1001, manufactured by FRX Polymers, molecular weight (Mn) of 1,500 g/mole), 0.2 parts by weight of 2-ethyl-4-methylimidazole solution (10% in methyl ethyl ketone), and 1.5 parts by weight of tris(2,4-ditert-butylphenyl) phosphite were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Comparative Example 3

64 parts by weight of cresol novolac epoxy resin (Epon 164, manufactured by Momentive), 36 parts by weight of hydroxyl terminated alkyl phosphonate oligomer (Nofia OL3001, manufactured by FRX Polymers, molecular weight (Mn) of 2,700 g/mole), and 0.2 parts by weight of 2-ethyl-4-methylimidazole solution (10% in methyl ethyl ketone) were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Example 8

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL3001, manufactured by FRX Polymers, molecular weight (Mn) of 2,700 g/mole), 0.2 parts by weight of 2-ethyl-4-methylimidazole solution (10% in methyl ethyl ketone), and 2.0 parts by weight of Stabaxol® 1 were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Example 9

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL3001, manufactured by FRX Polymers, molecular weight (Mn) of 2,700 g/mole), 0.2 parts by weight of 2-ethyl-4-methylimidazole solution (10% in methyl ethyl ketone), and 2.0 parts by weight of Stabaxol® P were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Example 10

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL3001, manufactured by FRX Polymers, molecular weight (Mn) of 2,700 g/mole), 0.2 parts by weight of 2-ethyl-4-methylimidazole solution (10% in methyl ethyl ketone), and 1.0 parts by weight of Stabaxol® 1 and 1.0 parts by weight of tris(2,4-ditert-butylphenyl) phosphite were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Example 11

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL3001, manufactured by FRX Polymers, molecular weight (Mn) of 2,700 g/mole), 0.2 parts by weight of 2-ethyl-4-methylimidazole solution (10% in methyl ethyl ketone), and 1.0 parts by weight of Stabaxol® P and 1.0 parts by weight of tris(2,4-ditert-butylphenyl) phosphite were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Example 12

64 parts by weight of cresol novolac epoxy resin (Epon 164, manufactured by Momentive, Epoxide Equivalent Weight of 200~240 g/eq.), 36 parts by weight of hydroxyl terminated alkyl phosphonate oligomer (Nofia OL3001, manufactured by FRX Polymers, molecular weight (Mn) of 2,700 g/mole), 0.2 parts by weight of 2-ethyl-4-methylimidazole solution (10% in methyl ethyl ketone), and 2.0 parts by weight of tris(2,4-ditert-butylphenyl) phosphite were mixed together, and then the mixture was dissolved in 60 parts by weight of methyl ethyl ketone, followed by mixing using a shaker for 60 minutes. The epoxy formulation was poured into a mold and solvent was evaporated at 130° C. for 30 minutes, and then cured at 200° C. for 60 minutes and 120 minutes. The glass transition temperature (Tg) of the cured epoxy resin was measured by using a differential scanning calorimeter (DSC) using TA Instrument Q20.

Comparison Examples 1-12

The components of and DSC analysis for each of Comparative Examples 1 through Example 7 is provided in Table 2:

TABLE 2

|  | Comp. Ex. 1 | Comp. Ex. 2 | Ex. 1 | Ex. 2 | Ex. 3 | Ex. 4 | Ex. 5 | Ex. 6 | Ex. 7 |
| --- | --- | --- | --- | --- | --- | --- | --- | --- | --- |
| Epon 164 (phr) | 64 | 64 | 64 | 64 | 64 | 64 | 64 | 64 | 64 |
| Nofia OL1001 (phr) | 36 | 36 | 36 | 36 | 36 | 36 | 36 | 36 | 36 |

TABLE 2-continued

|  | Comp. Ex. 1 | Comp. Ex. 2 | Ex. 1 | Ex. 2 | Ex. 3 | Ex. 4 | Ex. 5 | Ex. 6 | Ex. 7 |
|---|---|---|---|---|---|---|---|---|---|
| 2-ethyl-4-methylimidazole (phr) | 0.2 | 0.2 | 0.2 | 0.2 | 0.2 | 0.2 | 0.2 | 0.2 | 0.2 |
| Dicyandiamide (phr) | — | 4.0 | — | — | — | — | — | — | — |
| Stabaxol ® 1 (phr) | — | — | 1.0 | 1.0 | 2.0 | 2.0 | — | 1.0 | — |
| pentaerythritol tetrakis[3-(3',5'-di-tert-butyl-4'-hydroxyphenyl)propionate] (phr) | — | — | — | — | — | — | 1.0 | 0.5 | — |
| bis (2.4-di-t-butylphenyl) pentaerythritol diphosphite (phr) | — | — | — | — | — | — | 0.5 | 0.25 | — |
| tris(2,4-ditert-butylphenyl) phosphite (phr) | — | — | — | — | — | — | — | — | 1.5 |
| MEK (phr) | 60 | 60 | 60 | 60 | 60 | 60 | 60 | 60 | 60 |
| Cured temperature (° C.) | 190 | 190 | 190 | 200 | 190 | 200 | 200 | 200 | 200 |
| Results |  |  |  |  |  |  |  |  |  |
| DSC Tg at 60 min. (° C.) | 101 | 99 | 131 | 134 | 143 | 143 | 133 | 145 | 151 |
| DSC Tg at 120 min. (° C.) | 110 | 123 | 135 | 163 | 146 | 165 | 143 | 165 | 172 |
| DSC Tg at 180 min. (° C.) | 129 | 123 | 168 | — | 175 | — | — | — | — |

The components of and DSC analysis for Comparative Examples 3 and 8 through 12 is provided in Table 3:

TABLE 3

|  | Comp. Ex. 3 | Ex. 8 | Ex. 9 | Ex. 10 | Ex. 11 | Ex. 12 |
|---|---|---|---|---|---|---|
| Epon 164 (phr) | 64 | 64 | 64 | 64 | 64 | 64 |
| Nofia OL3001 (phr) | 36 | 36 | 36 | 36 | 36 | 36 |
| 2-ethyl-4-methylimidazole (phr) | 0.2 | 0.2 | 0.2 | 0.2 | 0.2 | 0.2 |
| Stabaxol ® 1 (phr) | — | 2.0 | — | 1.0 | — | — |
| Stabaxol ® P (phr) | — | — | 2.0 | — | 1.0 | — |
| tris(2,4-ditert-butylphenyl) phosphite (phr) | — | — | — | 1.0 | 1.0 | 2.0 |
| MEK (phr) | 60 | 60 | 60 | 60 | 60 | 60 |
| Cured temperature (° C.) | 200 | 200 | 200 | 200 | 200 | 200 |
| Results |  |  |  |  |  |  |
| DSC Tg at 60 min. (° C.) | 111 | 138 | 116 | 139 | 139 | 150 |
| DSC Tg at 120 min. (° C.) | 130 | 138 | 145 | 151 | 148 | 158 |

Examples 13-15

Varnish solutions (55-60 wt % in MEK) were prepared by mixing Epiclon N-673-80M, Nofia OL3001, Carbodilite V-03 and 2-methylimidazole in varying compositions summarized in Table 4. The varnish was impregnated into a glass cloth (#7628 type, 40 mm×6 mm×ca 0.55 mm) and dried for 2 minutes at 165° C. Four pieces of the glass cloth prepreg sheet were layered on top of each other and inserted into a silicone tube, which is then sandwiched in between two aluminum plates held together with clips. The 4-ply laminate was cured at 175° C. for 60 min, followed by 200° C. for 90 min. DMA measurements at 1 Hz were performed on the 4-ply cured test pieces.

Comparative Example 4

A varnish solution (60 wt % in MEK) was prepared by mixing 67 parts by weight of Epiclon N-673-80M, 33 parts by weight of Dow 92741 and 0.2 parts by weight of 2-methylimidazole. The varnish was impregnated into a glass cloth (#7628 type, 40 mm×6 mm×ca 0.55 mm) and dried for 2 minutes at 165° C. Four pieces of the glass cloth prepreg sheet were layered on top of each other and inserted into a silicone tube, which is then sandwiched in between two aluminum plates held together with clips. The 4-ply laminate was cured at 175° C. for 60 min, followed by 200° C. for 90 min. DMA measurements at 1 Hz were performed on the 4-ply cured test pieces.

TABLE 4

|  | Comp. Ex. 4 | Ex. 13 | Ex. 14 | Ex. 15 | Ex. 16 |
|---|---|---|---|---|---|
| Epiclon N-673-80M (phr) | 67 | 70 | 67 | 65 | 63 |
| Nofia OL3001 (phr) | — | 30 | 30 | 30 | 30 |
| 2-methylimidazole (phr) | 0.2 | 0.2 | 0.2 | 0.2 | 0.2 |
| Carbodilite V-03 (phr) | 0 | 0 | 3 | 5 | 8 |
| Dow 92741 | 33 | — | — | — | — |
| Cured temperature (° C.) | 200 | 200 | 200 | 200 | 200 |
| Results |  |  |  |  |  |
| DMA Tg at 90 min. (° C.) (tan delta) | 159 | 153 | 160 | 167 | 169 |
| DMA Tg at 90 min (° C.) (E") | 154 | 144 | 154 | 161 | 162 |

Examples 17-20

Varnish solutions (55-60 wt % in MEK) were prepared by mixing DCPD epoxy (XD-1000), Nofia OL3001 and 2-methylimidazole in varying compositions summarized in Table 5. The varnish was impregnated into a glass cloth (#7628 type, 40 mm×6 mm×ca 0.55 mm) and dried for 2 minutes at 165° C. Four pieces of the glass cloth prepreg sheet were layered on top of each other and inserted into a silicone tube, which is then sandwiched in between two aluminum plates held together with clips. The 4-ply laminate was cured at 175° C. for 60 min, followed by 200° C. for 90 min. DMA measurements at 1 Hz were performed on the 4-ply cured test pieces.

Comparative Example 5

A varnish solution (60 wt % in MEK) was prepared by mixing 67 parts by weight of DCPD epoxy (XD-1000), 33 parts by weight of Dow 92741 and 0.2 parts by weight of 2-methylimidazole. The varnish was impregnated into a glass cloth (#7628 type, 40 mm×6 mm×ca 0.55 mm) and dried for 2 minutes at 165° C. Four pieces of the glass cloth prepreg sheet were layered on top of each other and inserted into a silicone tube, which is then sandwiched in between two aluminum plates held together with clips. The 4-ply laminate was cured at 175° C. for 60 min, followed by 200° C. for 90 min. DMA measurements at 1 Hz were performed on the 4-ply cured test pieces.

TABLE 5

| | Comp. Ex. 5 | Ex. 17 | Ex. 18 | Ex. 19 | Ex. 20 |
|---|---|---|---|---|---|
| DCPD-EP XD-1000 (phr) | 67 | 70 | 67 | 65 | 63 |
| Nofia OL3001 (phr) | — | 30 | 30 | 30 | 30 |
| 2-methylimidazole (phr) | 0.2 | 0.2 | 0.2 | 0.2 | 0.2 |
| Carbodilite V-03 | 0 | 0 | 3 | 5 | 8 |
| Dow 92741 | 33 | — | — | — | — |
| Cured temperature (° C.) | 200 | 200 | 200 | 200 | 200 |
| Results | | | | | |
| DMA Tg at 90 min. (° C.) (tan delta) | 160 | 163 | 170 | 178 | 186 |
| DMA Tg at 90 min (° C.) (E") | 153 | 155 | 165 | 170 | 178 |

The invention claimed is:

1. A composition comprising:
a thermoset epoxy resin;
about 5 wt. % to about 60 wt. % of one or more oligomeric phosphonates having about 60% to about 100% reactive end groups based on a total number of termini, the oligomeric phosphonates not including co-oligo(phosphonate carbonate); and
about 0.5 wt. % to about 4.0 wt. % of one or more carbodiimides,
wherein the reactive end groups are selected from the group consisting of hydroxyl, carboxylic acid, epoxy, glycidyl ether, vinyl, vinyl ester, isopropenyl, isocyanate, or any combination thereof.

2. The composition of claim 1, wherein the epoxy resin is selected from the group consisting of novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylolpropane type epoxy resin, terpene-modified epoxy resin, linear aliphatic epoxy resin obtained by oxidizing olefin bonds with peracetic acid or peracid, alicyclic epoxy resin, sulfur-containing epoxy resin, phenolic novolac type epoxy containing benzoxazines, bisphenol-A based benzoxazines, bisphenol-F based benzoxazines, dicyclopentadiene based benzoxazines, phenolpthalein based benzoxazines, polyphenol-A type benzoxazines, and combinations thereof.

3. The composition of claim 1, wherein the one or more oligomeric phosphonates are selected from the group consisting of linear oligomeric phosphonates, branched oligomeric phosphonates, and hyperbranched oligomeric phosphonates.

4. The composition of claim 1, wherein the one or more oligomeric phosphonates are a random or block co-oligo (phosphonate ester).

5. The composition of claim 1, wherein the one or more oligomeric phosphonates have reactive end groups that are hydroxyl.

6. The composition of claim 1, wherein the one or more oligomeric phosphonates comprise a compound of formula (I):

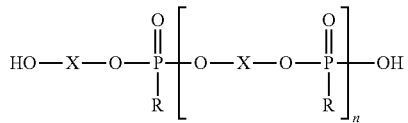

wherein R is a $C_1$ to $C_{20}$ alkyl or, optionally substituted, aryl group,
X is an aromatic, cycloalkyl, or aliphatic group, and
n is an integer of from 1 to about 10.

7. The composition of claim 1, wherein the one or more oligomeric phosphonates have a weight average molecular weight as determined by gel permeation chromatography based on polystyrene standards of about 500 g/mole to about 18,000 g/mole.

8. The composition of claim 1, wherein the one or more oligomeric phosphonates have a phosphorous content of about 2% to about 12% by weight.

9. The composition of claim 1, wherein the one or more carbodiimides are selected from the group consisting N,N'-dicyclohexylcarbodiimide, N-cyclohexyl-N'-(2-morpholinoethyl)carbodiimide metho-p-toluenesulfonate, bis(trimethylsilyl)carbodiimide, N-(3-dimethylaminopropyl)-N'-ethylcarbodiimide, N-(3-dimethylaminopropyl)-N'-ethylcarbodiimide hydrochloride, 1,3-di-p-tolylcarbodiimide, N,N'-bis(2-methylphenyl)carbodiimide, N-(tert-butyl)-N'-[1-(2-chlorophenyl)-1-methylethyl]carbodiimide, N-(tert-butyl)-N'-(2,6-dichlorophenyl)carbodiimide, N-butyl-N'-[1-(2-chlorophenyl)-1-methylethyl]carbodiimide, N,N'-diisopropylcarbodiimide, dicyclohexylcarbodiimide, N-benzyl-N'-cyclohexylcarbodiimide, and combinations thereof.

10. The composition of claim 1, further comprising one or more antioxidants.

11. The composition of claim 10, wherein the one or more antioxidants are a hindered phenolic antioxidant or a phosphite antioxidant.

12. The composition of claim 1, further comprising one or more additional components selected from the group consisting of chopped or continuous glass fiber, metal fibers, aramid fibers, carbon fibers, or ceramic fibers, surfactants, organic binders, polymeric binders, crosslinking agents, diluents, coupling agents, flame retardant agents, anti-dripping agents, fluorinated polyolefins, silicones, lubricants, mould release agents, pentaerythritol tetrastearate, nucleating agents, anti-static agents, conductive blacks, carbon nanotubes, graphite, graphene, oxidized graphene, organic antistatics, polyalkylene ethers, alkylsulfonates, perfluor sulfonic acid, perfluorbutane, sulfonic acid potassium salt, polyamide-containing polymers, catalysts, colorants, inks, dyes, antioxidants, stabilizers, and combinations thereof.

13. The composition of claim 12, comprising about 0.001 wt. % to about 1 wt. % of each individual additional component.

14. A method for making an epoxy formulation comprising:
combining an epoxy resin, about 5 wt. % to about 60 wt. % reactive phosphonate oligomer having about 60% to about 100% reactive end groups based on a total number of termini, about 0.5 wt. % to about 4.0 wt. % carbodiimide, and a catalyst in a solvent to form a mixture, the oligomeric phosphonates not including co-oligo(phosphonate carbonate); and
heating the mixture,
wherein the reactive end groups are selected from the group consisting of hydroxyl, carboxylic acid, epoxy, glycidyl ether, vinyl, vinyl ester, isopropenyl, isocyanate, or any combination thereof.

15. The method of claim 14, wherein heating is carried out to a temperature of about 20° C. to about 250° C.

16. The method of claim 14, wherein heating is carried out for 60 minutes to 300 minutes.

17. The method of claim 14, wherein heating is carried out at a pressure of about $3 \times 10^3$ Pa to about $1 \times 10^{-1}$ Pa.

18. The method of claim 14, wherein the catalyst is selected from the group consisting of transition metal catalysts, tertiary amines, imidazole containing compounds, and combinations thereof.

19. The method of claim 14, wherein the solvent is selected from the group consisting of perfluorohexane, a,a,a-trifluorotoluene, pentane, hexane, cyclohexane, methylcyclohexane, decalin [c+t], dioxane, carbon tetrachloride, freon-11, benzene, toluene, triethyl amine, carbon disulfide, diisopropyl ether, diethyl ether (ether), t-butyl methyl ether (MTBE), chloroform, ethyl acetate, 1,2-dimethoxyethane (glyme), 2-methoxyethyl ether (diglyme), tetrahydrofuran (THF), methylene chloride, pyridine (Py), methyl ethyl ketone (MEK), acetone, hexamethylphosphoramide, N-methylpyrrolidinone, nitromethane, dimethylformamide, acetonitrile, sulfolane, dimethyl sulfoxide, and propylene carbonate.

20. An article of manufacture comprising:
a thermoset epoxy resin; and
about 5 wt. % to about 60 wt. of one or more reactive oligomeric phosphonates having about 60% to about 100% reactive end groups based on a total number of termini, and about 0.5 wt. % to about 4.0 wt. % of one or more carbodiimides, the oligomeric phosphonates not including co-oligo(phosphonate carbonate),
wherein the reactive end groups are selected from the group consisting of hydroxyl, carboxylic acid, epoxy, glycidyl ether, vinyl, vinyl ester, isopropenyl, isocyanate, or any combination thereof.

21. The article of manufacture of claim 20, wherein the article is a prepreg or laminate.

22. The article of manufacture of claim 20, wherein the article is selected from the group consisting of televisions, computers, laptop computers, tablet computers, printers, cell phones, video games, DVD players, stereos, big data servers, and consumer electronics.

23. A composition comprising:
a thermoset epoxy resin;
about 5 wt. % to about 60 wt. % of one or more oligomeric phosphonates having about 60% to about 100% reactive end groups based on a total number of termini, the oligomeric phosphonates not including co-oligo(phosphonate carbonate), and
one or more hindered phenolic antioxidant, a phosphite antioxidant, or combinations thereof, and
about 0.5 wt. % to about 4.0 wt. % of one or more carbodiimides,
wherein the reactive end groups are selected from the group consisting of hydroxyl, carboxylic acid, epoxy, glycidyl ether, vinyl, vinyl ester, isopropenyl, isocyanate, or any combination thereof.

24. The composition of claim 23, wherein the one or more oligomeric phosphonates have a relative viscosity (llrel) as be determined by dissolving the sample in dichloromethane at 25° C. at a concentration of 0.5 g polymer/liter and measuring the solution with a viscometer of about 1.01 to about 1.10.

25. The composition of claim 23, wherein the one or more oligomeric phosphonates comprise a compound of formula (I):

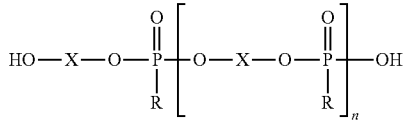

wherein
R is a $C_1$ to $C_{20}$ alkyl or, optionally substituted, aryl group,
X is an aromatic, cycloalkyl, or aliphatic group, and
n is an integer of from 1 to about 10.

26. The composition of claim 23, wherein the one or more hindered phenolic antioxidant, a phosphite antioxidant, or combinations thereof is selected from the group consisting of sterically hindered phenolic antioxidants, hydrolytically stable organophosphites, organophosphite antioxidants, sterically hindered lactone antioxidants, octadecyl-3-(3,5-di-tert-butyl-4-hydroxyphenyl)propionate, N,N'-hexane-1,6-diyibis(3-(3,5-di-tert-butyl-4-hydroxyphenylpropionamide)), 3,3',3',5,5',5'-hexa-tert-butyl-a,a',a'-(mesityl ene-2,4,6-triyl)tri-p-cresol, 4,6-bis(octylthiomethyl)-o-cresol, bis(2,4-ditert-butylphenyl)pentaerytritol diphosphite, tris(2,4-ditert-butylphenyl)phosphite, and combinations thereof.

27. The composition of claim 23, wherein the one or more hindered phenolic antioxidant, a phosphite antioxidant, or combinations thereof comprises about 0.01 wt. % to about 1.0 wt. % of the composition.

* * * * *